(12) United States Patent
Lee et al.

(10) Patent No.: US 11,525,316 B2
(45) Date of Patent: Dec. 13, 2022

(54) MID-PIPE PULLING DEVICE SYSTEMS AND METHODS

(71) Applicant: Trinity Bay Equipment Holdings, LLC, Houston, TX (US)

(72) Inventors: Christopher Sean Lee, Panama City, FL (US); John Paul Leger, Baytown, TX (US); Alexander Lee Winn, Houston, TX (US)

(73) Assignee: Trinity Bay Equipment Holdings, LLC, Houston, TX (US)

( * ) Notice: Subject to any disclaimer, the term of this patent is extended or adjusted under 35 U.S.C. 154(b) by 0 days.

(21) Appl. No.: 17/343,814

(22) Filed: Jun. 10, 2021

(65) Prior Publication Data
US 2022/0025720 A1 Jan. 27, 2022

Related U.S. Application Data

(60) Provisional application No. 63/054,891, filed on Jul. 22, 2020.

(51) Int. Cl.
| | |
|---|---|
| *F16L 1/038* | (2006.01) |
| *E21B 19/22* | (2006.01) |
| *B65H 75/30* | (2006.01) |
| *B65H 49/34* | (2006.01) |
| *F16L 1/024* | (2006.01) |

(52) U.S. Cl.
CPC ............. *E21B 19/22* (2013.01); *B65H 49/34* (2013.01); *B65H 75/30* (2013.01); *F16L 1/0243* (2013.01); *B65H 2402/42* (2013.01)

(58) Field of Classification Search
CPC ......... E21B 19/22; B65H 49/34; B65H 75/30; B65H 2402/42; F16L 1/0243; F16L 1/038; Y10S 294/902; Y10S 483/902; Y10S 901/31; B66C 1/422; B66C 1/585; B66C 1/442; B66C 1/42; B66C 3/12; B66C 1/30; B66C 1/59; B66C 1/34; B66C 3/06; H02G 1/081; H02G 1/06; H02G 1/00; H02G 1/083; H02G 11/02; H02G 1/088;
(Continued)

(56) References Cited

U.S. PATENT DOCUMENTS

| | | | | |
|---|---|---|---|---|
| 505,065 A | * | 9/1893 | Shaw | ...................... B66C 1/485 |
| | | | | 414/626 |
| 890,306 A | * | 6/1908 | Schmertz | ................ C03B 15/14 |
| | | | | 212/75 |

(Continued)

*Primary Examiner* — Edwin J Toledo-Duran
(74) *Attorney, Agent, or Firm* — Conrad J. Hsu

(57) ABSTRACT

Techniques for implementing and/or operating a pipe deployment system that includes pipe deployment equipment, in which a pipe drum having spooled thereon a pipe segment is to be loaded on the pipe deployment equipment, and a pulling device to be secured to an unspooled section of the pipe segment. The pulling device includes a device body having a first body arm and a second body arm, in which the device body is to be disposed around the unspooled section of the pipe segment, the first body arm is to be secured to a first cable branch, and the second body arm is to be secured to a second cable branch. The pulling device includes a first pipe grabber secured to the first body arm and a second pipe grabber secured to the second body arm such that the second pipe grabber and the first pipe grabber open towards one another.

20 Claims, 9 Drawing Sheets

(58) Field of Classification Search
CPC ...... H02G 7/053; B65G 47/90; B65G 49/061;
B65G 17/323; B25B 7/02; B25B 5/163
USPC .......... 414/745.6; 294/902, 118, 119, 81.61;
254/134.3 R
See application file for complete search history.

(56) References Cited

U.S. PATENT DOCUMENTS

| | | | | |
|---|---|---|---|---|
| 1,306,206 | A * | 6/1919 | Waknitz | B66C 3/12 294/112 |
| 1,344,320 | A * | 6/1920 | Thomas | B66C 1/585 294/118 |
| 1,351,226 | A * | 8/1920 | Barlow | B66C 23/50 212/243 |
| 1,353,503 | A * | 9/1920 | Andersen | B66C 1/585 294/118 |
| 1,439,245 | A * | 12/1922 | Knapp | B66C 1/422 414/626 |
| 1,725,458 | A * | 8/1929 | Krell | E21B 3/04 188/67 |
| 1,877,974 | A * | 9/1932 | Robb | F16L 1/038 414/745.6 |
| 1,966,240 | A * | 7/1934 | Erdahl | B66C 1/422 294/902 |
| 2,656,212 | A * | 10/1953 | Eckstein | B66C 1/585 294/110.1 |
| 2,776,164 | A * | 1/1957 | Eckstein | B66C 1/585 294/110.1 |
| 2,786,709 | A * | 3/1957 | Wirkkala | B66C 1/585 294/111 |
| 2,893,778 | A * | 7/1959 | Eckstein | B66C 23/36 294/110.1 |
| 3,008,753 | A * | 11/1961 | Tazioli | B66C 1/422 294/81.61 |
| 3,082,031 | A * | 3/1963 | Lindberg | B66C 1/585 414/731 |
| 3,330,590 | A * | 7/1967 | Sheridan | B66C 1/425 294/200 |
| 3,435,507 | A * | 4/1969 | Pronovost | F16L 1/09 29/237 |
| 3,488,080 | A * | 1/1970 | Hamilton | B66C 3/10 294/119 |
| 3,612,597 | A * | 10/1971 | Wirkkala | B66C 3/12 294/112 |
| 3,768,853 | A * | 10/1973 | Rennie | B66C 1/585 294/110.1 |
| 3,781,056 | A * | 12/1973 | Ransford | B66C 1/585 414/734 |
| 3,965,713 | A * | 6/1976 | Horton | B21C 47/22 242/174 |
| 3,978,990 | A * | 9/1976 | Honea | A01G 23/006 294/110.1 |
| 4,020,952 | A * | 5/1977 | Scodino | F16L 1/036 414/745.6 |
| 4,130,204 | A * | 12/1978 | Pickard | F16L 1/036 414/745.6 |
| 4,148,445 | A * | 4/1979 | Reynolds | B65H 75/4407 242/397.2 |
| 4,188,997 | A * | 2/1980 | Ainsworth | E21B 19/22 254/390 |
| 4,943,099 | A * | 7/1990 | Gabriel | B66C 1/34 294/118 |
| 5,141,386 | A * | 8/1992 | Barwise | B66C 3/005 403/348 |
| 5,533,834 | A * | 7/1996 | Recalde | B63B 35/03 405/168.1 |
| 6,012,752 | A * | 1/2000 | Douglas | B66C 1/422 294/119 |
| 6,131,978 | A * | 10/2000 | Rounds | B66C 1/585 294/902 |
| 6,234,717 | B1 * | 5/2001 | Corbetta | F16L 1/265 405/169 |
| 6,280,119 | B1 * | 8/2001 | Ryan | B66C 1/427 405/175 |
| 6,554,221 | B2 * | 4/2003 | Hinds | B65H 49/32 242/550 |
| 7,424,998 | B1 * | 9/2008 | Barney | B66C 3/18 294/118 |
| D598,174 | S * | 8/2009 | Lindberg | D34/33 |
| 2003/0014887 | A1 * | 1/2003 | Martinez | B66D 1/00 37/397 |
| 2015/0158692 | A1 * | 6/2015 | Reynolds | B65H 75/425 414/547 |

\* cited by examiner

MID-PIPE PULLING DEVICE SYSTEMS AND METHODS

CROSS-REFERENCE

The present disclosure claims priority to and benefit of U.S. Provisional Patent Application No. 63/054,891, entitled "MID-PIPE PULLING DEVICE SYSTEMS AND METHODS" and filed Jul. 22, 2020, which is incorporated herein by reference in its entirety for all purposes.

BACKGROUND

The present disclosure generally relates to pipeline systems and, more particularly, to a pulling device that may be used to facilitate deploying (e.g., laying) one or more pipe segments in a pipeline system.

Pipeline systems are often used to transport (e.g., convey) fluid, such as liquid and/or gas, from a fluid source to a fluid destination. For example, a pipeline system may be used to transport one or more hydrocarbons, such as crude oil, petroleum, natural gas, or any combination thereof. Additionally or alternatively, a pipeline system may be used to transport one or more other types of fluid, such as produced water, fresh water, fracturing fluid, flowback fluid, carbon dioxide, or any combination thereof.

To facilitate transporting fluid, a pipeline system may include one or more pipe segments in addition to pipe (e.g., midline and/or end) fittings, for example, which are used to connect a pipe segment to another pipeline component, such as another pipe fitting, another pipe segment, a fluid source, and/or a fluid destination. Generally, a pipe segment includes tubing, which defines (e.g., encloses) a pipe bore that provides a primary fluid conveyance (e.g., flow) path through the pipe segment. More specifically, the tubing of a pipe segment may be implemented to facilitate isolating (e.g., insulating) fluid being conveyed within its pipe bore from environmental conditions external to the pipe segment, for example, to reduce the likelihood of the conveyed (e.g., bore) fluid being lost to the external environmental conditions and/or the external environmental conditions contaminating the conveyed fluid (e.g., clean and/or potable water).

Additionally, in some instances, a pipe segment to be deployed in a pipeline system may be flexible and, thus, spooled (e.g., coiled, wrapped, and/or wound) on a pipe drum before being deployed in the pipeline system. Furthermore, in some such instances, a pipe deployment system may be implemented and/or operated to facilitate deploying (e.g., laying) a pipe segment spooled on a pipe drum into a pipeline system, for example, at least in part by enabling pulling force to be exerted on a free (e.g., unspooled) end of the pipe segment to unspool more of the pipe segment off of the pipe drum. However, at least in some instances, deploying a pipe segment from a pipe drum only by pulling on a free end of the pipe segment may potentially affect (e.g., reduce) deployment efficiency and/or operational efficiency of a pipeline system in which the pipe segment is deployed, for example, due to tensile force absorbed by the pipe segment increasing, and, thus, the pulling force that actually results at the pipe drum decreasing as distance between the free end of the pipe segment and the pipe drum increases.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one embodiment, a pipe deployment system includes pipe deployment equipment, in which a pipe drum having spooled thereon a pipe segment that includes tubing that defines a pipe bore and a fluid conduit within an annulus of the tubing is to be loaded on the pipe deployment equipment, and a pulling device to be secured to an unspooled section of the pipe segment to enable pulling equipment secured to the pulling device via a pulling cable to exert pulling force on the pipe segment. The pulling device includes a device body having a first body arm and a second body arm, in which the device body is to be disposed around the unspooled section of the pipe segment, the first body arm is to be secured to a first cable branch of the pulling cable, and the second body arm is to be secured to a second cable branch of the pulling cable that is connected to the first cable branch. Additionally, the pulling device includes a first pipe grabber secured to the first body arm of the device body and a second pipe grabber secured to the second body arm of the device body such that the second pipe grabber and the first pipe grabber open towards one another.

In another embodiment, a method of operating a pipe deployment system includes disposing a pulling device of the pipe deployment system around a free section of a pipe segment that has been unspooled off of a pipe drum, securing a first cable branch of a pulling cable to a first body arm of the pulling device via a first pad eye on the first body arm, securing a second cable branch of the pulling cable to a second body arm of the pulling device via a second pad eye on the second body arm, in which the second cable branch is connected to the first cable branch of the pulling cable, and exerting, using pulling equipment in the pipe deployment system, pulling force on the pulling cable in a direction away from the pulling device to cause the first body arm and the second body arm to move toward one another such that a first pipe grabber secured to the first body arm and a second pipe grabber secured to the second body arm engage an outer surface of the pipe segment as well as to cause more of the pipe segment to be unspooled off of the pipe drum.

In another embodiment, a pulling device in a pipe deployment system includes a device body. The device body includes a body base to be used cover a section of a pipe segment to be operated on by the pipe deployment system, a first body arm pivotably connected to the body base, in which the first body arm includes a first pad eye that enables a first cable branch of a pulling cable to be secured to the first body arm, a second body arm pivotably connected to the body base, in which the second body arm includes a second pad eye that enables a second cable branch of the pulling cable to be secured to the second body arm. Additionally, the pulling device includes a first pipe grabber secured to the first body arm of the device body, in which the first pipe grabber includes a first semi-circular pad to be used to engage an outer surface of the pipe segment when pulling force is exerted on the pulling cable to pivot the first body arm relative to the body base, and a second pipe grabber secured to the second body arm of the device body, in which the second pipe grabber includes a second semi-circular pad to be used to engage the outer surface of the pipe segment when pulling force is exerted on the pulling cable to pivot the second body arm relative to the body base.

DETAILED DESCRIPTION

Figure 1:
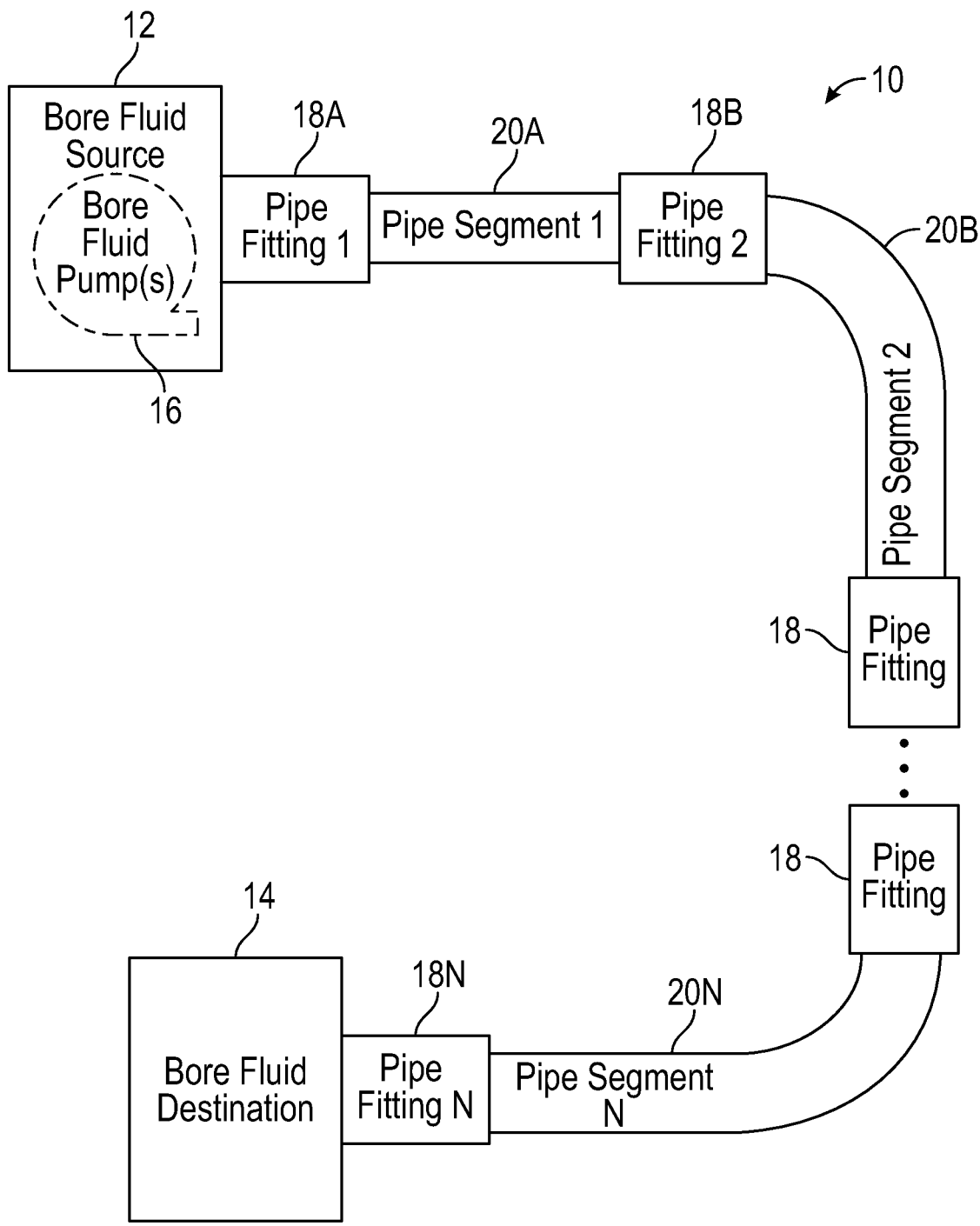
FIG. 1 is a block diagram of an example of a pipeline system including pipe segments and pipe fittings, in accordance with an embodiment of the present disclosure.

One or more specific embodiments of the present disclosure will be described below with reference to the figures. As used herein, the term "coupled" or "coupled to" may indicate establishing either a direct or indirect connection and, thus, is not limited to either unless expressly referenced as such. The term "set" may refer to one or more items.

Wherever possible, like or identical reference numerals are used in the figures to identify common or the same features. The figures are not necessarily to scale. In particular, certain features and/or certain views of the figures may be shown exaggerated in scale for purposes of clarification.

The present disclosure generally relates to pipeline systems that may be implemented and/or operated to transport (e.g., convey) fluid, such as liquid and/or gas, from a fluid source to a fluid destination. Generally, a pipeline system may include pipe fittings, such as a midline pipe fitting and/or a pipe end fitting, and one or more pipe segments. More specifically, a pipe segment may generally be secured and sealed in one or more pipe fittings to facilitate fluidly coupling the pipe segment to another pipeline component, such as another pipe segment, another pipe fitting, a fluid source, and/or a fluid destination. Merely as an illustrative non-limiting example, a pipeline system may include a first pipe end fitting secured to a first pipe segment to facilitate fluidly coupling the first pipe segment to the fluid source, a midline pipe fitting secured between the first pipe segment and a second pipe segment to facilitate fluidly coupling the first pipe segment to the second pipe segment, and a second pipe end fitting secured to the second pipe segment to facilitate fluidly coupling the second pipe segment to the fluid destination.

In any case, a pipe segment generally includes tubing that defines (e.g., encloses) a pipe bore, which provides a primary fluid conveyance (e.g., flow) path through the pipe segment. More specifically, the tubing of a pipe segment may be implemented to facilitate isolating environmental conditions external to the pipe segment from conditions within its pipe bore and, thus, fluid that flows therethrough. In particular, the tubing of a pipe segment may primarily be implemented to block fluid flow directly between the pipe bore of the pipe segment and its external environmental conditions, for example, in addition to providing thermal, pressure, and/or electrical isolation (e.g., insulation).

Furthermore, in some instances, a pipe segment may be flexible. In fact, in some such instances, the pipe segment may be spooled (e.g., coiled, wrapped, and/or wound) on a pipe drum, for example, which is implemented along with reel ends in a pipe reel or as an independent pipe drum. Moreover, in some such instances, a pipe deployment system may be implemented and/or operated to facilitate deploying (e.g., laying) the pipe segment from the pipe drum into a pipeline system. In particular, in such instances, the pipe segment and the pipe drum may be loaded onto pipe deployment equipment, such as a pipe deployment trailer or a pipe deployment frame, in the pipe deployment system and, thus, the pipe deployment system may operate to deploy the pipe segment in the pipeline system at least in part by unspooling (e.g., unwrapping and/or unwinding) the pipe segment off of the pipe drum.

To facilitate unspooling a pipe segment off of a corresponding pipe drum, a pipe deployment system may generally be implemented and/or operated to exert pulling force on a free (e.g., unspooled) section of the pipe segment. More specifically, to facilitate exerting pulling force on a pipe segment, in addition to pipe deployment equipment, the pipe deployment system may include a pulling device, which is implemented and/or operated to be secured to the pipe segment, and pulling equipment, such as a tow vehicle (e.g., truck), a bulldozer, an excavator, or the like. In some instances, the pulling device may be secured to a free (e.g., unspooled) end of a pipe segment as well as being secured to the pulling equipment (e.g., via one or more pulling cables), thereby enabling the pipe deployment system to operate to exert pulling force at the free end of the pipe segment and, thus, to facilitate unspooling the pipe segment off of a corresponding pipe drum.

However, at least in some instances, unspooling a pipe segment for deployment in a pipeline system by pulling only on a free end of the pipe segment may potentially limit deployment efficiency of the pipeline system. In particular, at least in some instances, as the distance between a pulling device secured to the pipe segment and a corresponding pipe drum increases and/or the number of bends (e.g., curves) through which the pipe segment is pulled increases, the pulling force that actually results at the pipe drum may be substantially (e.g., significantly) less than the pulling force exerted at the pulling device and, thus, limit deployment speed of the pipe segment, for example, due at least in part to more of the pipe segment stretching to absorb tensile (e.g., pulling) force exerted thereon and/or a bend in the pipeline system absorbing a (e.g., orthogonal) component of the pulling force exerted on the pipe segment. Additionally or alternatively, since the amount of tensile force absorbed by the pipe segment increases as the distance between a pulling device secured thereto and a corresponding pipe drum increases, the likelihood of the tensile force inadvertently deforming the pipe segment and/or otherwise compromising the structural integrity of the pipe segment may also increase as the distance between pulling device and the pipe drum increases and, thus, potentially limit operational reliability of the pipeline system.

Accordingly, to facilitate improving pipeline deployment efficiency and/or pipeline operational reliability, the present disclosure provides techniques for implementing and/or operating a pipe deployment system with one or more pulling devices that can be secured along a free (e.g., unspooled) section of a pipe segment (e.g., mid-pipe), for example, instead of solely at a free end of the pipe segment. To facilitate securing a pulling device to a pipe segment, the pulling device may include a device body, which implemented to be disposed around (e.g., on top of and/or cover) the pipe segment. In particular, as will be described in more detail below, the device body of a pulling device may include a first body arm and a second body arm, for example, in addition to a body base that is pivotably connected to the first body arm and the second body arm.

To facilitate securing its device body to a pipe segment, a pulling device in a pipe deployment system may additionally include pipe grabbers secured to its device body. In particular, in some embodiments, a pipe grabber of a pulling device may include a pad, which has a semi-circular radial cross-section profile that enables an inner surface of the pipe grabber to engage (e.g., grab onto) an outer surface of a pipe segment, and a stem secured to an outer surface of the pad. Furthermore, in some embodiments, a pulling device may include a pipe grabber secured to each body arm in its device body. For example, a first pipe grabber may be secured directly to a first body arm and a second pipe grabber may be secured directly to a second body arm such that the pipe grabbers open toward one another. In other words, at least in such embodiments, a pulling device may be secured to a pipe segment at least in part by moving its pipe grabbers toward one another while the pipe segment is disposed therebetween.

To facilitate pulling a pipe segment to which a pulling device is secured, the device body of the pulling device may be implemented to be secured to pulling equipment, such as a tow vehicle, in the pipe deployment system via one or more pulling cables. In fact, in some embodiments, the device body of a pulling device may be implemented to enable pulling force exerted on the pulling device via a pulling cable to be used to engage the pipe grabbers of the pulling device with the outer surface of a pipe segment that is disposed between the pipe grabbers and, thus, securing the pulling device to the pipe segment. In particular, at least in such embodiments, each body arm of the pulling device may include a pad eye, which is implemented to enable a corresponding cable branch of a pulling cable to be secured thereto. For example, a first cable branch of a pulling cable may be secured to the first body arm of the pulling device via a first pad eye on the first body arm and a second cable branch, which is connected to the first cable branch, may be secured to the second body arm of the pulling device via a second pad eye on the second body arm. Accordingly, when pulling force is exerted on the pulling cable in a direction away from the pulling device, the cable branches of the pulling cable may cause corresponding body arms of the pulling device and, thus, the pipe grabbers secured to the body arms to move towards one another.

Moreover, to facilitate reducing the likelihood that a pulling device in a pipe deployment system inadvertently compromises structural integrity of a pipe segment, in some embodiments, the pulling device may be implemented and/or operated to block movement of the pipe grabbers beyond a certain point. For example, in some such embodiments, the pipe grabbers in a pulling device may be implemented to block further compression once they directly abut one another. In other words, to facilitate pulling a pipe segment with a specific outer surface diameter while reducing the likelihood that a pulling device secured thereto inadvertently compromises the structural integrity of the pipe segment, in such embodiments, the pipe grabbers may be implemented such that the inner surface diameter that results when the pipe grabbers directly abut one another matches or is slightly smaller than a default (e.g., uncompressed and/or undeformed) outer surface diameter outer surface diameter of the pipe segment.

However, to facilitate further improving pipeline deployment efficiency, in some embodiments, a pulling device in a pipe deployment system may be implemented to enable the pulling device to be suitable for pulling pipe segments with different outer surface diameters. To facilitate accommodating multiple different pipe segment outer surface diameters, in some embodiments, a pulling device may additionally include one or more spacer bars, which are implemented to be secured between the body arms of the pulling device. More specifically, to facilitate securing a spacer bar between the body arms, a body arm of the pulling device may include one or more spacer bar openings, which each correspond with a different pipe segment outer surface diameter, implemented along its length. For example, the body arm may include a first spacer bar opening, which is implemented closer to a corresponding body base of the pulling device, and a second spacer bar opening, which is implementer farther from the body base of the pulling device. Since the body arm is pivotably connected to the body base, when secured in the first spacer bar opening, a spacer bar may abut an opposing body arm or an opposing spacer bar, which is secured to the opposing body arm, sooner than when the spacer bar is secured in the second spacer bar opening.

Additionally or alternatively, to facilitate accommodating multiple different pipe segment outer surface diameters, in some embodiments, the pipe grabbers of a pulling device may not be secured directly to the body arms of the pulling device. In particular, in some such embodiments, each pipe grabber of the pulling device may be secured to a corresponding body arm via a slide assembly that is implemented to flare out from a corresponding body. For example, a first pipe grabber may slide along the first body arm of the pulling device via a first slide assembly and a second pipe grabber may slide along the second body arm of the pulling device via a second slide assembly.

Thus, in such embodiments, the inner surface diameter of the pipe grabbers in a pulling device may vary with the position (e.g., location) of the pipe grabbers on corresponding body arms of the pulling device. For example, since corresponding slide assemblies are implemented to flare out from a body base of the pulling device, before pulling force is exerted on the body arms to move them toward one another, the inner surface diameter of the pipe grabbers may be smaller when the pipe grabbers are positioned closer to the body base and larger when the pipe grabbers are positioned farther from the body base. However, since the body arms are pivotably connected to the body base, once pulling force is exerted on the body arms to move them toward one another, the inner surface diameter of the pipe grabbers when the pipe grabbers are positioned closer to the body base may actually become larger than when the pipe grabbers are positioned farther from the body base. In any case, to facilitate reducing the likelihood that a pipe grabber moves from a target position on a body arm that corresponds with the outer surface diameter of a pipe segment to be pulled using the pulling device, in some embodiments, a corresponding slide assembly of the pulling device may include a pin sub-assembly and/or a rachet sub-assembly, which is implemented and/or operated to facilitate securing the pipe grabber in place on the body arm.

Instead of being secured directly to corresponding body arms, in other embodiments, pipe grabbers of a pulling device may be secured to the body arms via a scissor linkage assembly. For example, in such embodiments, a first pipe grabber may be secured to the first body arm of the pulling device via a first linkage arm of the scissor linkage assembly and a second pipe grabber may be secured to the second body arm of the pulling device via a second linkage arm of the scissor linkage assembly, which is pivotably connected to the first linkage arm. In this manner, as will be described in more detail below, implementing and/or operating a pulling device in a pipe deployment system in accordance with the techniques described in the present disclosure may enable the pipe deployment system to exert pulling force on a pipe segment mid-pipe (e.g., not at free end), which, at least in some instances, may facilitate improving pipeline deployment efficiency and/or pipeline operational reliability, for example, at least in part by increasing the pulling force that actually results at a corresponding pipe drum and/or reducing the tensile (e.g., pulling) force absorbed by the pipe segment.

In fact, to facilitate further improving pipeline deployment efficiency and/or pipeline operational reliability, in some embodiments, a pulling device in a pipe deployment system may be implemented to enable the pulling device to be selectively operated as a guiding device. Generally, a guiding device in a pipe deployment system may operate to guide a pipe segment through a point at which a corresponding pipeline system is to be deployed as the pipe segment is pulled (e.g., unspooled) off of a corresponding pipe drum. In other words, the guiding device may generally facilitate anchoring the pipeline system at a target position while one or more pipe segments is being deployed (e.g., pulled and laid) therein.

To enable being selectively operated as a guiding device, a pulling device may additionally include one or more guide assemblies. In particular, in some embodiments, a guide assembly of a pulling device may include a roller spring, which has a first end that is to be secured in a roller recess formed on the inner surface of a corresponding pipe grabber, and a guide roller, which is secured to a second end of the roller spring such that the guide roller extends out beyond the inner surface of the pipe grabber while the roller spring is in a static (e.g., equilibrium) state. In other words, while the roller spring is in its static state, the guide assembly may be in an activated state in which the guide roller extends out beyond the roller recess and, thus, the inner surface of the pipe grabber. As such, when a pipe segment is disposed within the pulling device while the guide assembly is in its activated state, the guide roller may contact the outer surface of the pipe segment before the inner surface of the pipe grabber and, thus, facilitate anchoring a corresponding pipeline system in place while reducing the resistance the pulling (e.g., guiding) device exerts against movement of the pipe segment therethrough.

However, since a pipe segment being pulled therethrough may exert force on its guide roller, to facilitate reducing the likelihood of a guide assembly in a pulling device inadvertently transitioning from its activated state to a deactivated state in which its guide roller does not extend out of a corresponding roller recess, in some embodiments, the guide assembly may additionally include a pin sub-assembly. In particular, in some such embodiments, the pin sub-assembly of a guide assembly may be implemented and/or operated to selectively block the guide roller of the guide assembly from fully retracting into a corresponding roller recess and, thus, to selectively lock the guide assembly in its activated state. Additionally or alternatively, the pin sub-assembly of a guide assembly may be implemented and/or operated to selectively block a guide roller of the guide assembly from extending out of a corresponding roller recess and, thus, to selectively lock the guide assembly in its deactivated state. In any case, in this manner, as will be described in more detail below, implementing and/or operating a pulling device in a pipe deployment system in accordance with the techniques described in the present disclosure may enable the pulling device to be selectively used to pull a pipe segment into a pipeline system and to be selectively used to guide a pipe segment as it is being deployed in the pipeline system, which, at least in some instances, may facilitate improving deployment efficiency of the pipeline system, for example, at least in part by obviating inclusion of a separate guiding device in the pipe deployment system.

To help illustrate, an example of a pipeline system 10 is shown in FIG. 1. As in the depicted example, the pipeline system 10 may be coupled between a bore fluid source 12 and a bore fluid destination 14. Merely as an illustrative non-limiting example, the bore fluid source 12 may be a production well and the bore fluid destination 14 may be a fluid storage tank. In other instances, the bore fluid source 12 may be a first (e.g., lease facility) storage tank and the bore fluid destination 14 may be a second (e.g., refinery) storage tank.

In any case, the pipeline system 10 may generally be implemented and/or operated to facilitate transporting (e.g., conveying) fluid, such as gas and/or liquid, from the bore fluid source 12 to the bore fluid destination 14. In fact, in some embodiments, the pipeline system 10 may be used in many applications, including without limitation, both onshore and offshore oil and gas applications. For example, in such embodiments, the pipeline system 10 may be used to transport one or more hydrocarbons, such as crude oil, petroleum, natural gas, or any combination thereof. Additionally or alternatively, the pipeline system 10 may be used to transport one or more other types of fluid, such as produced water, fresh water, fracturing fluid, flowback fluid, carbon dioxide, or any combination thereof.

To facilitate flowing fluid to the bore fluid destination 14, in some embodiments, the bore fluid source 12 may include one or more bore fluid pumps 16 that are implemented and/or operated to inject (e.g., pump and/or supply) fluid from the bore fluid source 12 into a bore of the pipeline system 10. However, it should be appreciated that the depicted example is merely intended to be illustrative and not limiting. In particular, in other embodiments, a bore fluid pump 16 may not be implemented at the bore fluid source 12, for example, when fluid flow through the bore of the pipeline system 10 is produced by gravity. Additionally or alternatively, in other embodiments, one or more bore fluid pumps 16 may be implemented in the pipeline system 10 and/or at the bore fluid destination 14.

To facilitate transporting fluid from the bore fluid source 12 to the bore fluid destination 14, as in the depicted example, a pipeline system 10 may include one or more pipe fittings 18 and one or more pipe segments 20. For example, the depicted pipeline system 10 includes a first pipe segment 20A, a second pipe segment 20B, and an Nth pipe segment 20N. Additionally, the depicted pipeline system 10 includes a first pipe (e.g., end) fitting 18A, which couples the bore fluid source 12 to the first pipe segment 20A, a second pipe (e.g., midline) fitting 18B, which couples the first pipe segment 20A to the second pipe segment 20B, and an Nth pipe (e.g., end) fitting 18N, which couples the Nth pipe segment 20N to the bore fluid destination 14.

However, it should again be appreciated that the depicted example is merely intended to be illustrative and not limiting. In particular, in other embodiments, a pipeline system 10 may include fewer than three (e.g., one or two) pipe segments 20 or more than three (e.g., four, five, or more) pipe segments 20. Additionally or alternatively, in other embodiments, a pipeline system 10 may include fewer than four (e.g., one, two, or three) pipe fittings 18 or more than four (e.g., five, six, or more) pipe fittings 18.

In any case, as described above, a pipe segment 20 generally includes tubing that may be used to convey (e.g., transfer and/or transport) water, gas, oil, and/or any other suitable type of fluid. The tubing of a pipe segment 20 may be made of any suitable type of material, such as plastic, metal, and/or a composite (e.g., fiber-reinforced composite) material. In fact, as will be described in more detail below, in some embodiments, the tubing of a pipe segment 20 may be implemented using multiple different layers. For example, the tubing of a pipe segment 20 may include a first high-density polyethylene (e.g., internal corrosion protection) layer, one or more reinforcement (e.g., steel strip) layers external to the first high-density polyethylene layer, and a second high-density polyethylene (e.g., external corrosion protection) layer external to the one or more reinforcement layers.

Additionally, as in the depicted example, one or more (e.g., second and/or Nth) pipe segments 20 in a pipeline system 10 may be curved. To facilitate implementing a curve in a pipe segment 20, in some embodiments, the pipe segment 20 may be flexible, for example, such that the pipe segment 20 is spoolable on a pipe drum. In other words, in some embodiments, one or more pipe segments 20 in the pipeline system 10 may be a flexible pipe, such as a bonded flexible pipe, an unbonded flexible pipe, a flexible composite pipe (FCP), a thermoplastic composite pipe (TCP), or a reinforced thermoplastic pipe (RTP). In fact, at least in some instances, increasing the flexibility of a pipe segment 20 may facilitate improving deployment efficiency of a pipeline system 10, for example, by obviating a curved (e.g., elbow) pipe fitting 18 and/or enabling the pipe segment 20 to be transported to the pipeline system 10, deployed in the pipeline system 10, or both using a tighter spool.

To facilitate improving pipe flexibility, in some embodiments, the tubing of a pipe segment 20 that defines (e.g., encloses) its pipe bore may include one or more openings devoid of solid material. In fact, in some embodiments, an opening in the tubing of a pipe segment 20 may run (e.g., span) the length of the pipe segment 20 and, thus, define (e.g., enclose) a fluid conduit in the annulus of the tubing, which is separate from the pipe bore. In other words, in such embodiments, fluid may flow through a pipe segment 20 via its pipe bore, a fluid conduit implemented within its tubing annulus, or both.

Figure 2:
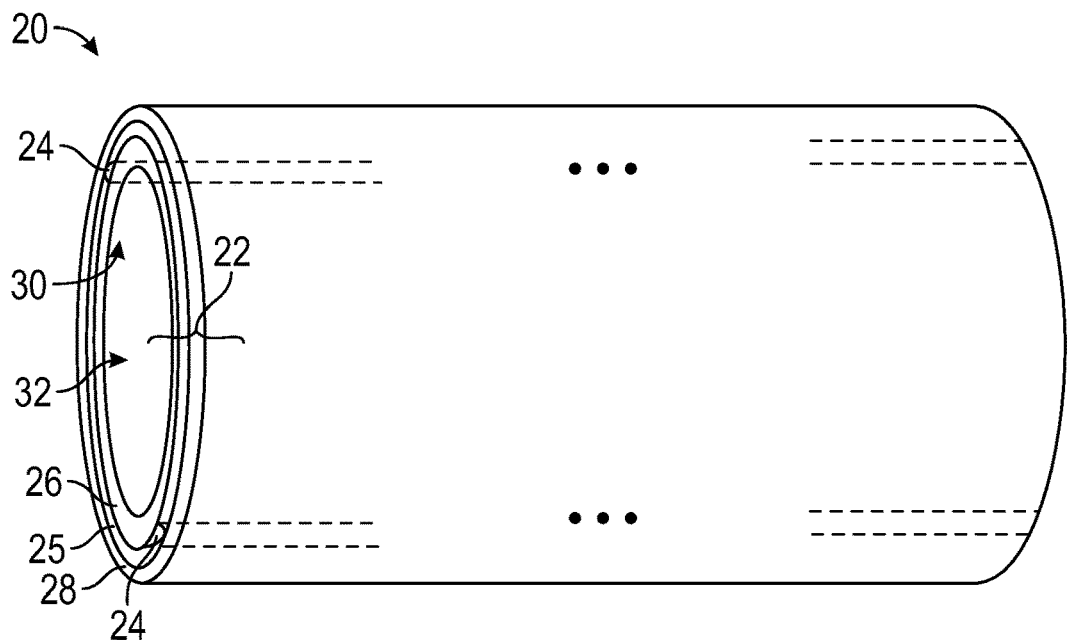
FIG. 2 is a side view of an example of a pipe segment of FIG. 1 that includes a pipe bore defined by its tubing as well as fluid conduits implemented within an annulus of its tubing, in accordance with an embodiment of the present disclosure.

To help illustrate, an example of a pipe segment 20, which includes tubing 22 with fluid conduits 24 implemented in a tubing annulus 25, is shown in FIG. 2. As depicted, the pipe segment tubing 22 is implemented with multiple layers including an inner barrier (e.g., liner and/or sheath) layer 26 and an outer barrier (e.g., shield and/or sheath) layer 28. In some embodiments, the inner barrier layer 26 and/or the outer barrier layer 28 of the pipe segment tubing 22 may be implemented using composite material and/or plastic, such as high-density polyethylene (HDPE), raised temperature polyethylene (PE-RT), cross-linked polyethylene (XLPE), polyamide 11 (PA-11), polyamide 12 (PA-12), polyvinylidene difluoride (PVDF), or any combination thereof. Although a number of particular layers are depicted, it should be understood that the techniques described in the present disclosure may be broadly applicable to composite pipe body structures including two or more layers, for example, as distinguished from a rubber or plastic single-layer hose subject to vulcanization. In any case, as depicted, an inner surface 30 of the inner barrier layer 26 defines (e.g., encloses) a pipe bore 32 through which fluid can flow, for example, to facilitate transporting fluid from a bore fluid source 12 to a bore fluid destination 14.

Additionally, as depicted, the annulus 25 of the pipe segment tubing 22 is implemented between its inner barrier layer 26 and its outer barrier layer 28. As will be described in more detail below, the tubing annulus 25 may include one or more intermediate layers of the pipe segment tubing 22. Furthermore, as depicted, fluid conduits 24 running along the length of the pipe segment 20 are defined (e.g., enclosed) in the tubing annulus 25. As described above, a fluid conduit 24 in the tubing annulus 25 may be devoid of solid material. As such, pipe segment tubing 22 that includes one or more fluid conduits 24 therein may include less solid material and, thus, exert less resistance to flexure, for example, as compared to solid pipe segment tubing 22 and/or pipe segment tubing 22 that does not include fluid conduits 24 implemented therein. Moreover, to facilitate further improving pipe flexibility, in some embodiments, one or more layers in the tubing 22 of a pipe segment 20 may be unbonded from one or more other layers in the tubing 22 and, thus, the pipe segment 20 may be an unbonded pipe.

However, it should be appreciated that the depicted example is merely intended to be illustrative and not limiting. In particular, in other embodiments, pipe segment tubing 22 may include fewer than two (e.g., one) or more than two (e.g., three, four, or more) fluid conduits 24 defined in its tubing annulus 25. Additionally or alternatively, in other embodiments, a fluid conduit 24 defined in a tubing annulus 25 of a pipe segment 20 may run non-parallel to the pipe bore 32 of the pipe segment 20, for example, such that the fluid conduit 24 is skewed relative to the longitudinal axis of the pipe bore 32.

Figure 3:
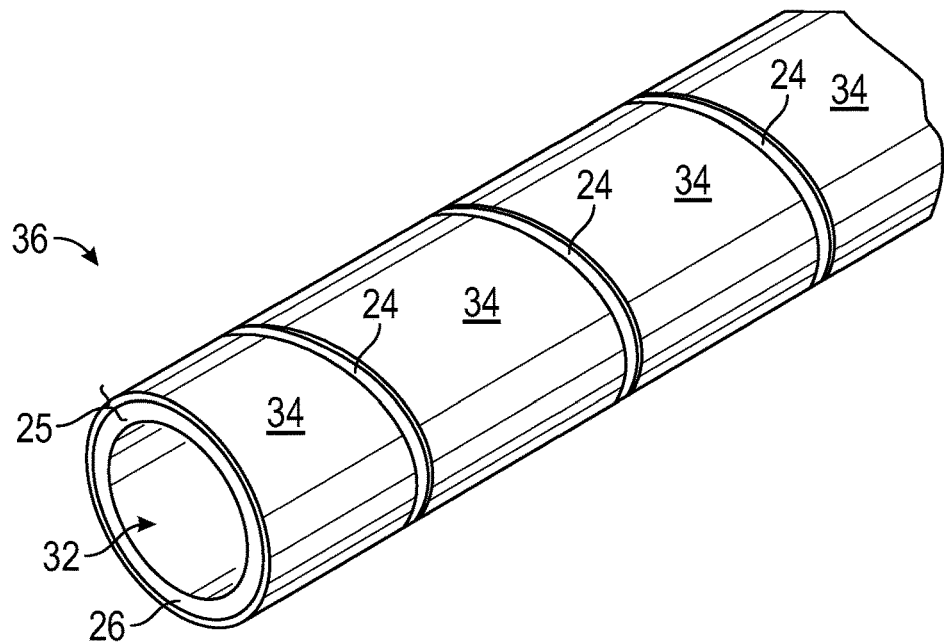
FIG. 3 is an example of a portion of the pipe segment of FIG. 2 with a helically shaped fluid conduit implemented within the annulus of its tubing, in accordance with an embodiment of the present disclosure.

To help illustrate, an example of a portion 36 of a pipe segment 20, which includes an inner barrier layer 26 and an intermediate layer 34 included in a tubing annulus 25 of its pipe segment tubing 22, is shown in FIG. 3. In some embodiments, one or more intermediate layers 34 of the pipe segment tubing 22 may be implemented using a solid material that has a higher tensile strength and/or a higher hoop strength as compared to a solid material used to implement the inner barrier layer 26. For example, the inner barrier layer 26 may be implemented using plastic, such as high-density polyethylene (HDPE), while an intermediate layer 34 is implemented using composite material and/or metal, such as carbon steel, stainless steel, duplex stainless steel, super duplex stainless steel, or any combination thereof. In other words, at least in some such embodiments, an intermediate layer 34 of the pipe segment tubing 22 may be implemented using electrically conductive, which, at least in some instances, may enable communication of electrical (e.g., test and/or return) signals via the intermediate layer 34.

In any case, as depicted, the intermediate layer 34 is helically disposed (e.g., wound and/or wrapped) on the inner barrier layer 26 such that gaps (e.g., openings) are left between adjacent windings to define a fluid conduit 24. In other words, in some embodiments, the intermediate layer 34 may be implemented at least in part by winding a solid strip of material around the inner barrier layer 26 at a non-zero lay angle (e.g., fifty-four degrees) relative to the longitudinal axis of the pipe bore 32. In any case, as depicted, the resulting fluid conduit 24 runs helically along the pipe segment 20, for example, such that the fluid conduit 24 is skewed fifty-four degrees relative to the longitudinal axis of the pipe bore 32.

In some embodiments, an outer barrier layer 28 may be disposed directly over the depicted intermediate layer 34 and, thus, cover and/or define (e.g., enclose) the depicted fluid conduit 24. However, in other embodiments, the tubing annulus 25 of pipe segment tubing 22 may include multiple (e.g., two, three, four, or more) intermediate layers 34. In other words, in such embodiments, one or more other intermediate layers 34 may be disposed over the depicted intermediate layer 34. In fact, in some such embodiments, the one or more other intermediate layers 34 may also each be helically disposed such that gaps are left between adjacent windings to implement one or more corresponding fluid conduits 24 in the pipe segment tubing 22.

For example, a first other intermediate layer 34 may be helically disposed on the depicted intermediate layer 34 using the same non-zero lay angle as the depicted intermediate layer 34 to cover (e.g., define and/or enclose) the depicted fluid conduit 24 and to implement another fluid conduit 24 in the first other intermediate layer 34. Additionally, a second other intermediate layer 34 may be helically disposed on the first other intermediate layer 34 using another non-zero lay angle, which is the inverse of the non-zero lay angle of the depicted intermediate layer 34, to implement another fluid conduit 24 in the second other intermediate layer 34. Furthermore, a third other intermediate layer 34 may be helically disposed on the second other intermediate layer 34 using the same non-zero lay angle as the second other intermediate layer 34 to cover the other fluid conduit 24 in the second other intermediate layer 34 and to implement another fluid conduit 24 in the third other intermediate layer 34. In some embodiments, an outer barrier layer 28 may be disposed over the third other intermediate layer 34 and, thus, cover (e.g., define and/or enclose) the other fluid conduit 24 in the third other intermediate layer 34. In any case, as described above, in some instances, one or more pipe segments 20 may be deployed in a pipeline system 10 via a pipe deployment system.

Figure 4:
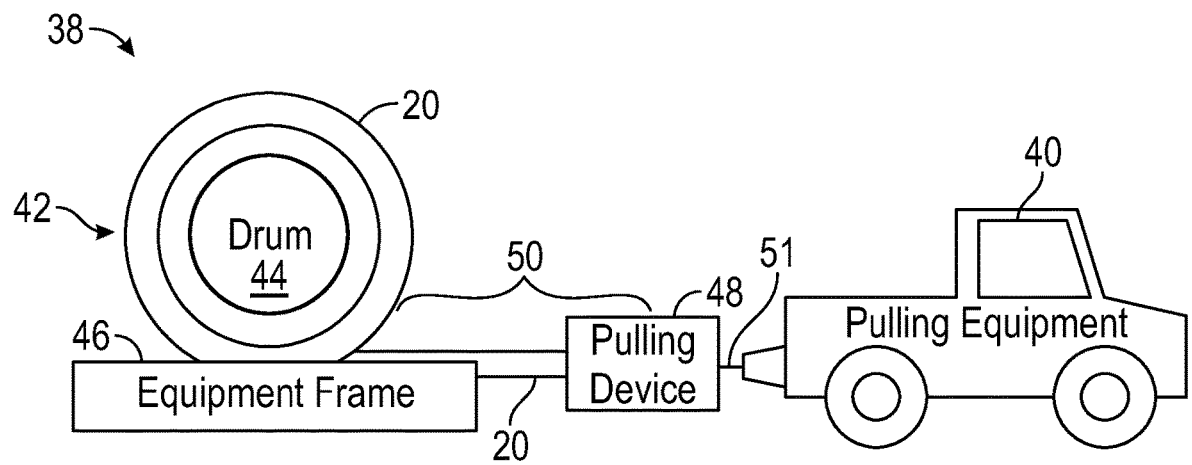
FIG. 4 is a side view of an example of a pipe deployment system that includes a pulling device and pipe deployment equipment, which is loaded with a pipe segment that is spooled on a pipe drum and secured to the pulling device, in accordance with an embodiment of the present disclosure.

To help illustrate, an example of a pipe deployment system 38 is shown in FIG. 4. As depicted, the pipe deployment system 38 includes pulling equipment 40 and pipe deployment equipment 42, such as a pipe deployment trailer or a pipe deployment frame. In some embodiments, the pulling equipment 40 may be a tow vehicle (e.g., truck), a bulldozer, an excavator, or the like.

Additionally, as depicted, a pipe drum 44 and one or more pipe segments 20 spooled (e.g., wrapped and/or wound) thereon are loaded on an equipment frame 46 of the pipe deployment equipment 42. In some embodiments, the pipe drum 44 may be an independent pipe drum 44. However, in other embodiments, the pipe drum 44 may be included in a pipe reel that includes reel ends on either side of the pipe drum 44.

In any case, as depicted, the pipe deployment system 38 additionally includes a pulling device 48. In particular, as depicted, the pulling device 48 is secured to a free (e.g., unspooled) section 50 of a pipe segment 20 as well as being secured to the pulling equipment 40 via one or more pulling cables 51. For example, in some instances, the pulling device 48 may be secured to a free end of the pipe segment 20, thereby enabling the pulling equipment 40 to exert pulling force on the pulling device 48 and, thus, the pipe segment 20 that facilitates unspooling more of the pipe segment 20 off of the pipe drum 44.

However, at least in some instances, unspooling a pipe segment 20 for deployment in in a pipeline system 10 by pulling solely on a free end of the pipe segment 20 may potentially limit deployment efficiency and/or operational reliability of the pipeline system. In particular, at least in some instances, as the distance between the pulling device 48 and the pipe drum 44 increases and/or the number of bends (e.g., curves) through which the pipe segment 20 is pulled increases, the pulling force that actually results at the pipe drum 44 may be substantially (e.g., significantly) less than the pulling force exerted at the pulling device 48, thereby limiting deployment speed of the pipe segment 20, for example, due at least in part to more of the pipe segment 20 stretching to absorb tensile (e.g., pulling) force exerted thereon and/or a bend in the pipeline system 10 absorbing a (e.g., orthogonal) component of the pulling force exerted on the pipe segment 20. Additionally or alternatively, since the amount of tensile force absorbed by the pipe segment 20 increases as the distance between the pulling device 48 and the pipe drum 44 increases, the likelihood of the tensile force inadvertently deforming the pipe segment 20 and/or otherwise compromising the structural integrity of the pipe segment 20 may also increase as the distance between pulling device 48 and the pipe drum 44 increases, thereby potentially limiting operational reliability of the pipeline system 10.

Accordingly, to facilitate improving pipeline deployment efficiency and/or pipeline operational reliability, the present disclosure provides techniques for implementing and/or operating a pipe deployment system 38 with one or more pulling devices 48 that can be secured along a non-end portion of the free section 50 of the pipe segment 20. In other words, as will be described in more detail below, the present disclosure describes techniques for implementing and/or operating a pulling device 48 that can be secured to a pipe segment 20 mid-pipe. However, it should be appreciated that, in some embodiments, a mid-pipe pulling device 48 may nevertheless be secured to a free end of a pipe segment 20 as well as a non-end portion of the pipe segment 20, for example, at different times.

Figure 5:
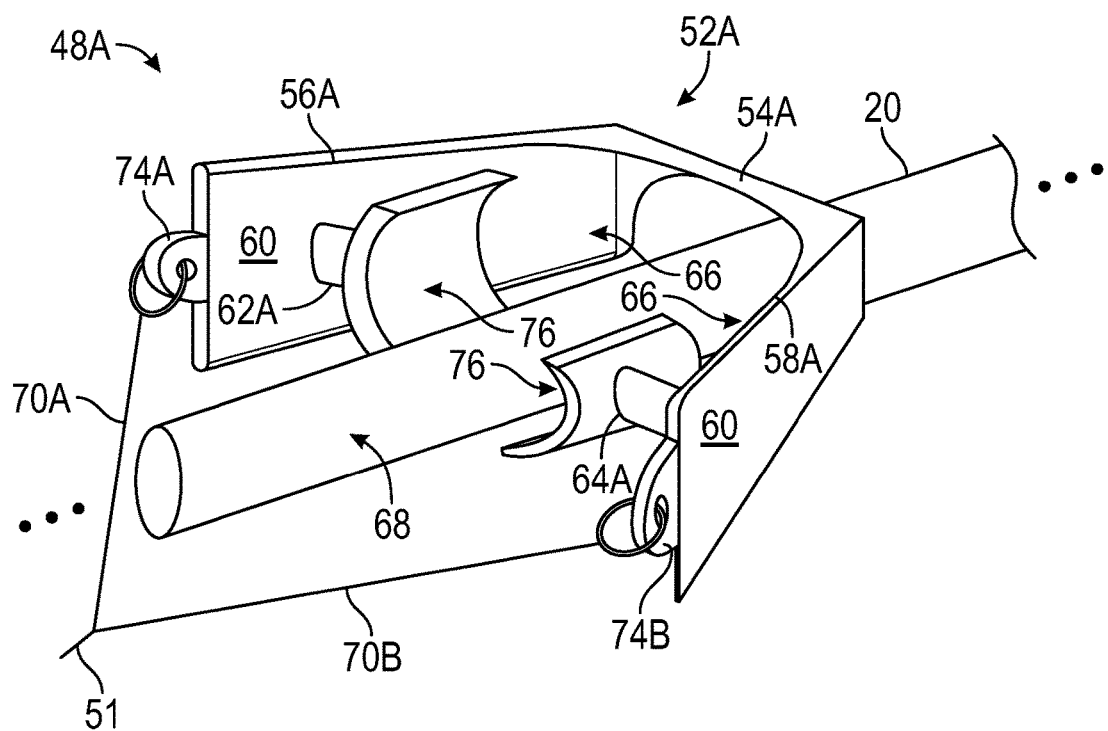
FIG. 5 is a perspective view of an example of the pulling device of FIG. 4, in accordance with an embodiment of the present disclosure.

To help illustrate, an example of a (e.g., mid-pipe) pulling device 48A, which may be included in a pipe deployment system 38, is shown in FIG. 5. As depicted, the pulling device 48A includes a device body 52A disposed over a pipe segment 20. In particular, the device body 52A includes a body base 54A and body arms—namely a first body arm 56A and a second body arm 58A, which each includes a sidewall 60 that is implemented to flare out (e.g., extend non-orthogonally) from the body base 54A. In other words, as in the depicted example, in some embodiments, the device body 52 of a pulling device 48 may be implemented to generally be V-shaped, for example, before its body arms are pivoted relative to its body base 54 via a pulling cable 51.

Additionally, as depicted, the pulling device 48A includes pipe grabbers—namely a first pipe grabber 62A and a second pipe grabber 64A—secured to its body arms. In particular, in the depicted example, the first pipe grabber 62A is secured directly to an inner surface 66 of the first body arm 56A. Similarly, in the depicted example, the second pipe grabber 64A is secured directly to an inner surface 66 of the second body arm 58A.

However, it should be appreciated that the depicted example is merely intended to be illustrative and not limiting. In particular, in other embodiments, pipe grabbers of a pulling device 48 may not be secured directly to a body arm of the pulling device 48, for example, to facilitate accommodating multiple different pipe segment outer surface diameters. Additionally or alternatively, in other embodiments, a pulling device 48 may include multiple pipe grabbers secured to one or more of its body arms.

In any case, as in the depicted example, in some embodiments, a pipe grabber (e.g., first pipe grabber 62 or second pipe grabber 64) of a pulling device 48 may include a pad, which has a semi-circular radial profile, and a stem, which is secured to an outer surface of the pad. Additionally, as in the depicted example, the first pipe grabber 62A and the second pipe grabber 64A may open towards one another. In other words, at least in such embodiments, the pipe grabbers may engage an outer surface 68 of the pipe segment 20 and, thus, facilitate securing the pulling device 48A to the pipe segment 20 when moved toward one another.

To facilitate moving the pipe grabbers toward one another as well as exerting pulling force on the pipe segment 20, as depicted, cable branches 70 of a pulling cable 51 are each secured to a corresponding body arm of the pulling device 48A. In particular, first cable branch 70A is secured to the first body arm 56A via a first pad eye 74A on the first body arm 56A. Similarly, a second cable branch 70B is secured to the second body arm 58A via a second pad eye 74B on the second body arm 58A.

As such, when pulling force is exerted on the pulling cable 51 in a direction away from the pulling device 48A, the pulling force may cause the first body arm 56A and the second body arm 58A to pivot relative to the body base 54A toward one another and, thus, the first pipe grabber 62A and the second pipe grabber 64A to move towards one another. In this manner, the pulling device 48A may use the pulling force exerted thereon to facilitate securing the pulling device 48A at any point along a free section 50 of the pipe segment 20, for example, mid-pipe instead of being limited to a free end of the pipe segment 20. Once secured to the pipe segment 20, the pulling device 48A may transfer at least a portion of pulling force exerted thereon to the pipe segment 20 and, thus, facilitate pulling the pipe segment 20, for example, to unspool the pipe segment 20 off of a corresponding pipe drum 44 and/or to deploy (e.g., lay) the pipe segment 20 in a pipeline system 10.

However, as pulling force continues to be exerted on the pulling cable 51, in some instances, the pulling device 48A may continue pushing its pipe grabbers farther into the pipe segment 20 until the pipe grabbers directly abut one another. Moreover, at least in some instances, over compressing the outer surface 68 of a pipe segment 20 may deform and/or otherwise compromise structural integrity of the pipe segment 20. As such, to facilitate improving pipeline operational reliability, in some embodiments, the first pipe grabber 62A and the second pipe grabber 64B of the pulling device 48A may be implemented such that the inner surface diameter of the pipe grabbers resulting when the pipe grabbers directly abut one another matches or is slightly smaller than a default (e.g., uncompressed and/or undeformed) outer surface diameter of the pipe segment 20. Additionally, to facilitate reducing the amount the outer surface 68 of the pipe segment 20 is compressed before the pulling device 48A is secured thereto, in some embodiments, an inner surface 76 of a pipe grabber may be implemented using friction promoting material, such as rubber, and/or contoured, for example, with teeth and/or serrations. In this manner, a pulling device 48 of a pipe deployment system 38 may be implemented to enable the pipe deployment system 38 to exert pulling force mid-pipe (e.g., not at end) on a pipe segment 20 to be deployed in a pipeline system 10, which, at least in some instances, may facilitate improving pipeline deployment efficiency and/or pipeline operational reliability, for example, at least in part by increasing the pulling force that actually results at a corresponding pipe drum 44 and/or reducing the tensile (e.g., pulling) force absorbed by the pipe segment 20.

Nevertheless, it should be appreciated that the depicted example is merely intended to be illustrative and not limiting. In particular, as will be described in more detail below, in other embodiments, a device body 52 of a pulling device 48 may be implemented with a different shape, for example, a U-shape, a rectangular shape, and/or without a body base 54. Additionally, as will be described in more detail below, in other embodiments, the body base 54 and the body arms of a device body 52 may be implemented as separate components and, thus, the body arms may be secured to the body base 54 via pivotable fasteners, such as a nut and bolt pair. Furthermore, as will be described in more detail below, in other embodiments, the pipe grabbers of a pulling device 48 may be implemented directly using the inner surface of corresponding body arms and, thus, the pulling device 48 may not include discrete pipe grabbers. Moreover, to facilitate further improving pipeline deployment efficiency, in other embodiments, a pulling device 48 in a pipe deployment system 38 may be implemented to be suitable for pulling pipe segments 20 with different outer surface diameters.

Figure 6:
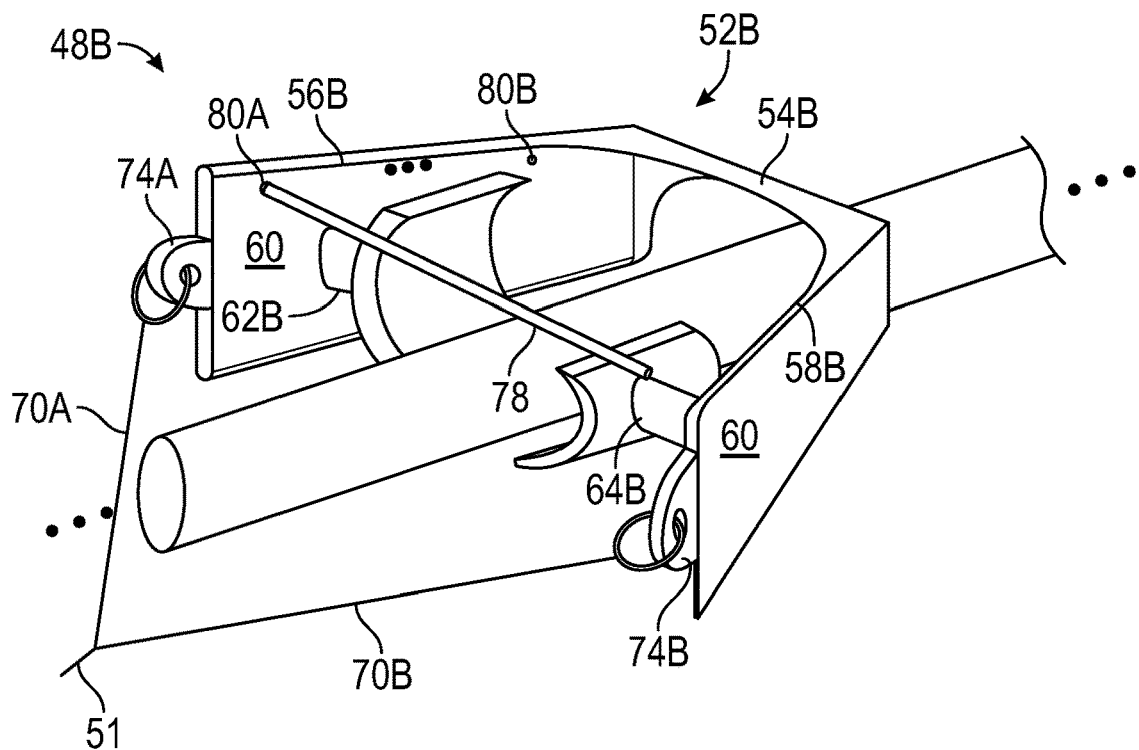
FIG. 6 is a perspective view on another example of the pulling device of FIG. 4 that includes a spacer bar, in accordance with an embodiment of the present disclosure.

To help illustrate, another example of a (e.g., mid-pipe) pulling device 48B, which may be included in a pipe deployment system 38, is shown in FIG. 6. Similar to FIG. 5, as depicted in FIG. 6, the device body 52B of the pulling device 48B includes a body base 54B, a first body arm 56B, which is implemented to flare out from the body base 54B and secured to a first cable branch 70A of a pulling cable 51 via a first pad eye 74A, and a second body arm 58B, which is implemented to flare out from the body base 54B and secured to a second cable branch 70B of the pulling cable 51 via a second pad eye 74B. Additionally, similar to FIG. 5, as depicted in FIG. 6, the pulling device 48B includes a first pipe grabber 62B secured directly to the sidewall 60 of the first body arm 56B and a second pipe grabber 64B secured directly to the sidewall 60 of the second body arm 58B. In fact, in some embodiments, the pipe grabbers (e.g., first pipe grabber 62B and second pipe grabber 64B) of FIG. 6 may generally match the pipe grabbers (e.g., first pipe grabber 62A and second pipe grabber 64A) of FIG. 5 and/or the device body 52B of FIG. 6 may generally match the device body 52A of FIG. 5.

However, as depicted in FIG. 6, the pulling device 48B additionally includes a spacer bar 78. In particular, in the depicted example, the spacer bar 78 is secured in a (e.g., first) spacer bar opening 80A implemented in the sidewall 60 of the first body arm 56B such that the spacer bar 78 extends out toward the sidewall 60 of the second body arm 58B. As such, when the body arms of the pulling device 48B are forced toward one another, the spacer bar 78 may eventually push against the second body arm 58B and, thus, block further compression, for example, before the pipe grabbers of the pulling device 48B directly abut one another, thereby enabling the pulling device 48B to be suitable for pulling at least two different pipe segment outer surface diameters.

To facilitate increasing the number of different pipe segment outer surface diameters that a pulling device 48 can accommodate, as in the depicted example, in some embodiments, a body arm of the pulling device 48 may include multiple spacer bar openings 80 implemented at varying distances from the body base 54 of the pulling device 48. In particular, in the depicted example, the first body arm 56B of the pulling device 48B additionally includes another (e.g., second) spacer bar opening 80B, which is implemented closer to the body base 54B of the pulling device 48B than the (e.g., first) spacer bar opening 80A. Thus, when secured in the other spacer bar opening 80B, the spacer bar 78 may block further compression sooner than when the spacer bar 78 is secured in the spacer bar opening 80A. In this manner, a pulling device 48 of a pipe deployment system 38 may be implemented to be suitable for pulling multiple different pipe segment outer surface diameters mid-pipe, which, at least in some instances, may facilitate improving pipeline deployment efficiency, for example, at least in part by reducing the number of different pulling devices 48 used to deploy a pipeline system 10 that will include pipe segments 20 with different outer surface diameters.

However, it should be appreciated that the depicted example is merely intended to be illustrative and not limiting. In particular, in some embodiments, a pulling device 48 may be selectively operated without its spacer bar 78, for example, when its pipe grabbers are implemented to block over compression of a pipe segment 20 to be pulled by the pulling device 48. Additionally, in other embodiments, a pulling device 48 may include a single spacer bar opening 80.

Furthermore, in other embodiments, a pulling device 48 may include multiple spacer bars 78. In particular, in some such embodiments, the pulling device 48 may include a first spacer bar 78 secured to its first body arm 56 and a second spacer bar 78 secured to its second body arm 58 such that they engage one another as the body arms are moved toward one another. In other such embodiments, to facilitate accommodating multiple different pipe segment outer surface diameters, the pulling device 48 may include multiple spacer bars 78, which each has a different length, that may be selectively secured to a corresponding body arm of the pulling device 48, for example, based on the outer surface diameter of a pipe segment 20 to be pulled via the pulling device 48. Moreover, in other embodiments, pipe grabbers of a pulling device 48 may not be secured directly to its body arms, for example, to facilitate increasing the number of different pipe segment outer surface diameters that the pulling device 48 is suitable for pulling.

Figure 7:
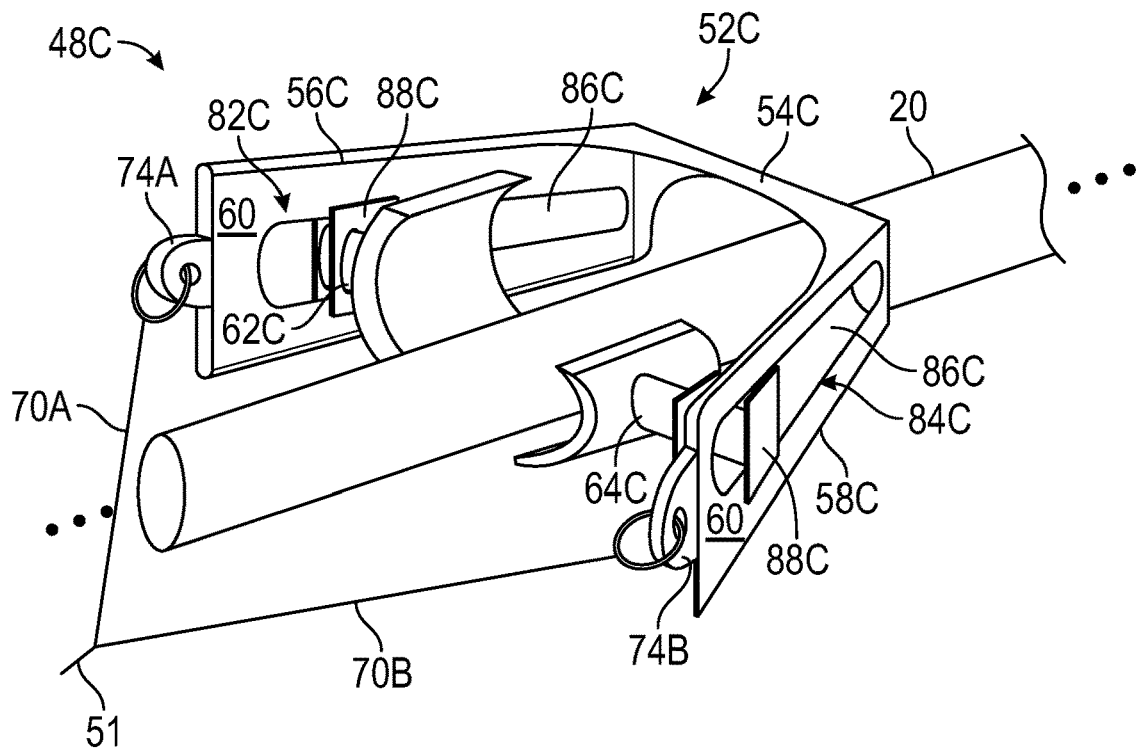
FIG. 7 is a perspective view of another example of the pulling device of FIG. 4 that includes pipe grabbers secured via slide assemblies, in accordance with an embodiment of the present disclosure.

To help illustrate, another example of a (e.g., mid-pipe) pulling device 48C, which may be included in a pipe deployment system 38, is shown in FIG. 7. Similar to FIG. 5, as depicted in FIG. 7, the device body 52C of the pulling device 48C includes body base 54C, a first body arm 56C, which is implemented to flare out from the body base 54C and secured to a first cable branch 70A of a pulling cable 51 via a first pad eye 74A, and a second body arm 58C, which is implemented to flare out from the body base 54C and secured to a second cable branch 70B of the pulling cable 51 via a second pad eye 74B. Additionally, similar to FIG. 5, as depicted in FIG. 7, the pulling device 48B includes a first pipe grabber 62C secured to the sidewall 60 of the first body arm 56C and a second pipe grabber 64C secured to the sidewall 60 of the second body arm 58C. In fact, in some embodiments, the pipe grabbers (e.g., first pipe grabber 62C and second pipe grabber 64C) of FIG. 7 may generally match the pipe grabbers (e.g., first pipe grabber 62A and second pipe grabber 64A) of FIG. 5 and/or the device body 52C of FIG. 7 may generally match the device body 52A of FIG. 5.

However, as depicted in FIG. 7, the pipe grabbers of the pulling device 48C are secured to the body arms of the pulling device 48C via corresponding slide assemblies, for example, instead of being secured directly thereto. In particular, the first pipe grabber 62C is secured to the sidewall 60 of the first body arm 56C via a first slide assembly 82C. Similarly, the second pipe grabber 64C is secured to the sidewall 60 of the second body arm 58C via a second slide assembly 84C.

Additionally, as depicted, each slide assembly of the pulling device 48C includes a slide opening 86C, which is implemented (e.g., formed) along the sidewall 60 of a corresponding body arm, and a slidable fastener 88C. In other words, since the sidewalls 60 of the body arms are implemented to flare out from the body base 54C, the slide assemblies may also be implemented to flare out from the body base 54C, for example, before pulling force is exerted on the body arms to move them toward one another. Furthermore, as depicted, the slidable fasteners 88C may each be implemented to secure a pipe grabber of the pulling device 48C to a corresponding body arm while enabling the pipe grabber to slide (e.g., selectively) within a corresponding slide opening 86C and, thus, along the body arm.

Since the slide assemblies are implemented to flare out from the body base 54C, before pulling force is exerted to move the body arms towards one another, the inner surface diameter of the pipe grabbers may be smaller when positioned closer to the body base 54C and larger when positioned farther from the body base 54C. However, since the body arms are pivotably connected to the body base 54C of the pulling device 48C, movement of the body arms may cause the pipe grabbers to move more when positioned farther from the body base 54C as compared to when the pipe grabbers are positioned closer to the body base 54C. In fact, while pulling force is exerted on the body arms, the inner surface diameter of the pipe grabbers when positioned farther from the body base 54C may actually become smaller than when positioned closer to the body base 54C.

In other words, the slide assemblies 84C of the pulling device 48C may enable the inner surface diameter of the pipe grabbers to be adjusted by changing the position (e.g., location) of the pipe grabbers along the sidewalls 60 of the body arms. In fact, in some embodiments, different positions along a body arm (e.g., first body arm 56 or second body arm 58) of a pulling device 48 may be associated with different pipe segment outer surface diameters. For example, a first position on the body arm, which is closer to the body base 54C, may be associated with a smaller pipe segment outer surface diameter (e.g., four inches) while a second position on the body arm, which is farther from the body base 54C, may be associated with a larger pipe segment outer surface diameter (e.g., six inches or eight inches) or vice versa. In fact, in some such embodiments, the second position on the body arm may be associated with a first pipe segment outer surface diameter, which is larger than the pipe segment outer surface diameter associated with the first position on the body arm, as well as a second pipe segment outer surface diameter, which is smaller than the pipe segment diameter associated with the first position on the body arm.

In any case, in such embodiments, the pipe grabbers of the pulling device 48C may be set at target positions on the body arms that are associated with the outer surface diameter of a pipe segment 20 that is to be pulled via the pulling device 48C. To facilitate reducing the likelihood of a pipe grabber inadvertently moving from its target position on a body arm, in some embodiments, a corresponding slide assembly of the pulling device 48C may additionally include a rachet subassembly and/or a pin subassembly that is implemented and/or operated to selectively lock its slidable fastener 88 and, thus, the pipe grabber secured thereto in place on the body arm. In this manner, a pulling device 48 of a pipe deployment system 38 may be implemented to be suitable for pulling multiple different pipe segment outer surface diameters mid-pipe, which, at least in some instances, may facilitate improving pipeline deployment efficiency, for example, at least in part by reducing the number of different pulling devices 48 used to deploy a pipeline system 10 that will include pipe segments 20 with different outer surface diameters.

However, it should be appreciated that the depicted example is merely intended to be illustrative and not limiting. In particular, to facilitate reducing likelihood of over compressing a pipe segment, the pulling device 48C of FIG. 7 may additionally include one or more spacer bars 78 and one or more spacer bar openings 80 implemented in its body arms. Additionally, as mentioned above, in other embodiments, the device body 52 of a pulling device 48 may be implemented with a different shape, for example, a U-shape and/or a rectangular shape.

Figure 8:
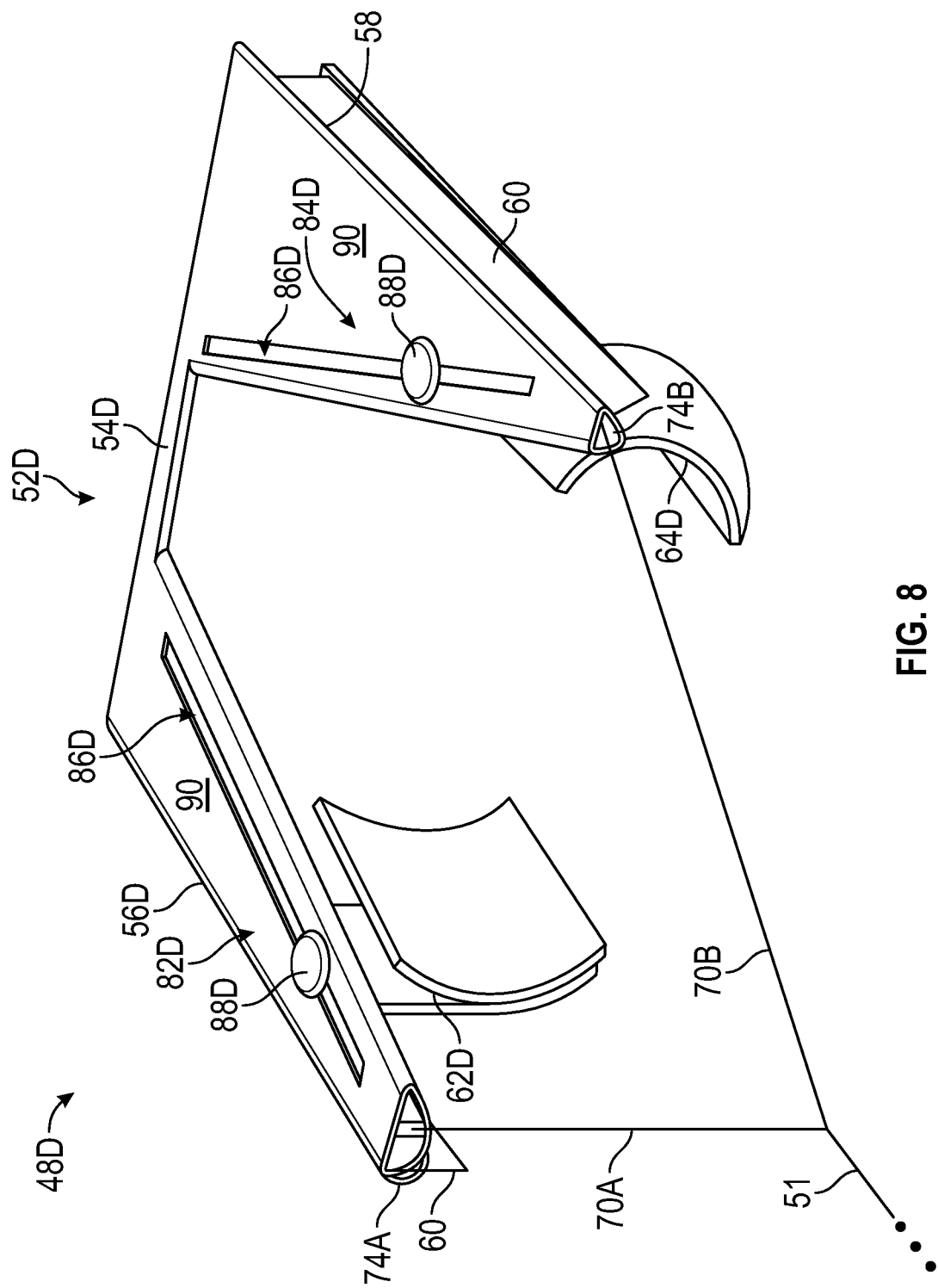
FIG. 8 is a perspective view of another example of the pulling device of FIG. 4 that includes pipe grabbers secured via slide assemblies, in accordance with an embodiment of the present disclosure.

To help illustrate, another example of a (e.g., mid-pipe) pulling device 48D, which may be included in a pipe deployment system 38, is shown in FIG. 8. Similar to FIG. 7, as depicted in FIG. 8, the device body 52D of the pulling device 48D includes a first body arm 56D, which is secured to a first cable branch 70A of a pulling cable 51 via a first pad eye 74A, a second body arm 58D, which is secured to a second cable branch 70B of the pulling cable 51 via a second pad eye 74B, and a body base 54D, which is pivotably connected to the first body arm 56D and the second body arm 58D. Additionally, similar to FIG. 7, as depicted in FIG. 8, the pulling device 48B includes a first pipe grabber 62D secured to the first body arm 56D via a first slide assembly 82D and a second pipe grabber 64D secured to the second body arm 58C via a second slide assembly 84D.

However, as depicted in FIG. 8, the slide assemblies of the pulling device 48D are secured to top plates 90 of its body arms, for example, instead of sidewalls 60 of its body arms. Nevertheless, similar to FIG. 7, as depicted in FIG. 8, each slide assembly of the pulling device 48D includes a slide opening 86D, which is implemented to flare out from the body base 54D, and a slidable fastener 88D, which is secured to a pipe grabber to enable the pipe grabber to slide within the slide opening 86D and, thus, along a corresponding body arm. In other words, even though the sidewalls 60 of the body arms are implemented to be substantially orthogonal to the body base 54D, as depicted, the slide assemblies of the pulling device 48D may be implemented to flare out from the body base 54D, for example, before pulling force is exerted on the body arm to move them toward one another.

In fact, similar to FIG. 7, in some embodiments, different positions along a body arm (e.g., first body arm 56D or second body arm 58D) of the pulling device 48D in FIG. 8 may be associated with different pipe segment outer surface diameters. For example, a first position closer on the body arm, which is closer to the body base 54D, may be associated with a smaller pipe segment outer surface diameter (e.g., four inches) while a second position on the body arm, which is farther from the body base 54C, may be associated with a larger pipe segment outer surface diameter (e.g., six inches or eight inches) or vice versa. In fact, in some such embodiments, the second position on the body arm may be associated with a first pipe segment outer surface diameter, which is larger than the pipe segment outer surface diameter associated with the first position on the body arm, as well as a second pipe segment outer surface diameter, which is smaller than the pipe segment diameter associated with the first position on the body arm.

In any case, in such embodiments, the pipe grabbers of the pulling device 48D may be set at target positions on the body arms that are associated with the outer surface diameter of a pipe segment 20 that is to be pulled via the pulling device 48C. To facilitate reducing the likelihood of a pipe grabber inadvertently moving from its target position on a body arm, in some embodiments, a corresponding slide assembly of the pulling device 48D may additionally include a rachet subassembly and/or a pin subassembly that is implemented and/or operated to selectively lock its slidable fastener 88 and, thus, the pipe grabber secured thereto in place on the body arm. In this manner, a pulling device 48 of a pipe deployment system 38 may be implemented to be suitable for pulling multiple different pipe segment outer surface diameters mid-pipe, which, at least in some instances, may facilitate improving pipeline deployment efficiency, for example, at least in part by reducing the number of different pulling devices 48 used to deploy a pipeline system 10 that will include pipe segments 20 with different outer surface diameters.

However, it should be appreciated that the depicted example is merely intended to be illustrative and not limiting. In particular, to facilitate reducing the likelihood of over compressing a pipe segment 20, the pulling device 48D if FIG. 8 may additionally include one or more spacer bars 78 and one or more spacer bar openings 80 implemented in its body arms. Additionally, as mentioned above, in other embodiments, the body base 54 and the body arms of a device body 52 may be implemented as separate components and, thus, the body arms may be secured to the body base 54 via pivotable fasteners, such as a nut and bolt pair. Furthermore, as will be described in more detail below, in other embodiments, the pipe grabbers of a pulling device 48 may be implemented directly using the inner surface of corresponding body arms and, thus, the pulling device 48 may not include discrete pipe grabbers.

Figure 9:
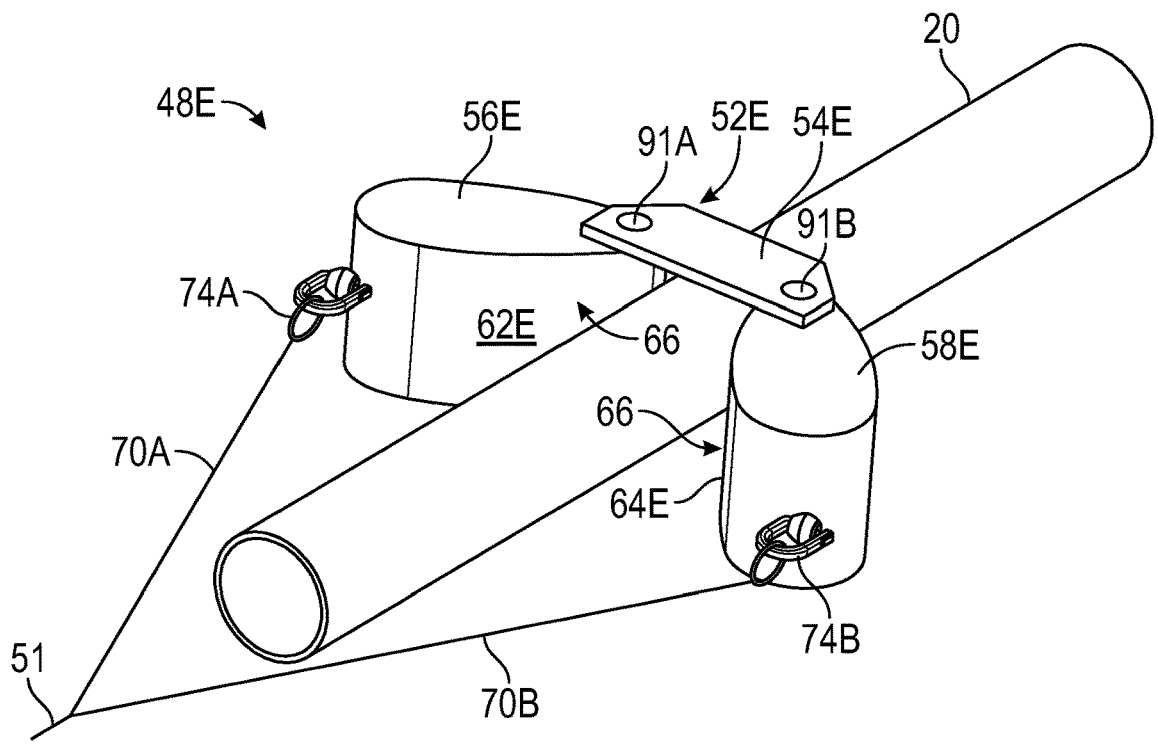
FIG. 9 is a perspective view of another example of the pulling device of FIG. 4 that includes integrated pipe grabbers, in accordance with an embodiment of the present disclosure.

To help illustrate, another example of a (e.g., mid-pipe) pulling device 48E, which may be included in a pipe deployment system 38, is shown in FIG. 9. Similar to FIG. 5, as depicted in FIG. 9, the device body 52E of the pulling device 48E includes a first body arm 56E, which is secured to a first cable branch 70A of a pulling cable 51 via a first pad eye 74A. Additionally, similar to FIG. 5, as depicted in FIG. 9, the device body 52E of the pulling device 48E includes a second body arm 58E, which is secured to a second cable branch 70B of the pulling cable 51 via a second pad eye 74B.

However, as depicted in FIG. 9, the first body arm 56E is secured to the body base 54E of the pulling device 48E via a first pivotable fastener 91A and the second body arm 58E is secured to the body base 54E via a second pivotable fastener 91B. In some embodiments, a pivotable fastener 91 in a pulling device 48 may be a nut and bolt pair. Additionally, as depicted in FIG. 9, a first pipe grabber 62E is implemented directly via the inner surface 66 of the first body arm 56 and a second pipe grabber 64E is implemented directly via the inner surface 66 of the second body arm 58E. In other words, in such embodiments, a pulling device 48 may not include discrete pipe grabbers.

Nevertheless, similar to FIG. 5, when pulling force is exerted on the pulling cable 51 in a direction away from the pulling device 48E, the pulling force may cause the first body arm 56E and the second body arm 58E to pivot relative to the body base 54E toward one another and, thus, the first pipe grabber 62E and the second pipe grabber 64E to move towards one another. In this manner, the pulling device 48E may use the pulling force exerted thereon to facilitate securing the pulling device 48E at any point along a free section 50 of the pipe segment 20, for example, mid-pipe instead of being limited to a free end of the pipe segment 20. Once secured to the pipe segment 20, the pulling device 48E may transfer at least a portion of pulling force exerted thereon to the pipe segment 20 and, thus, facilitate pulling the pipe segment 20, for example, to unspool the pipe segment 20 off of a corresponding pipe drum 44 and/or to deploy (e.g., lay) the pipe segment 20 in a pipeline system 10.

However, it should be appreciated that the depicted example is merely intended to be illustrative and not limiting. In particular, to facilitate reducing the likelihood of over compressing a pipe segment 20, the pulling device 48E of FIG. 9 may additionally include one or more spacer bars 78 and one or more spacer bar openings 80 implemented in its body arms. Additionally or alternatively, in other embodiments, the body arms of the pulling device 48E may be implemented with curved inner surfaces 66 and, thus, the pipe grabbers of the pulling device 48E may have semicircular radial profiles. Furthermore, as mentioned above, in other embodiments, the device body 52 of a pulling device 48 may be implemented with a different shape, for example, which does not include a body base 54.

Figure 10:
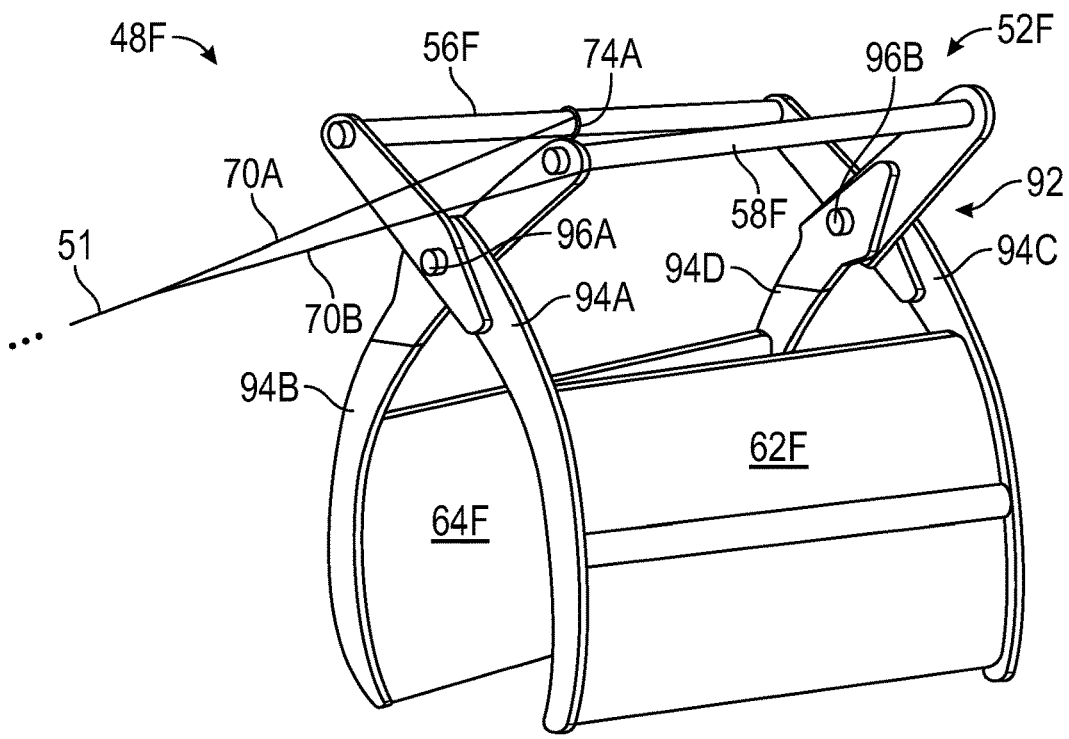
FIG. 10 is a perspective view of another example of the pulling device of FIG. 4 that includes pipe grabbers secured via a scissor linkage assembly, in accordance with an embodiment of the present disclosure.

To help illustrate, another example of a (e.g., mid-pipe) pulling device 48F, which may be included in a pipe deployment system 38, is shown in FIG. 10. Similar to FIG. 5, as depicted in FIG. 10, the device body 52F includes a first body arm 56F, which is secured to a first cable branch 70A of a pulling cable 51 via a first pad eye 74A, and a second body arm 58F. Although obfuscated from view, similar to FIG. 5, the second body arm 58F in FIG. 10 is secured to a second cable branch 70B of the pulling cable 51 via a second pad eye 74B.

However, as depicted in FIG. 10, the device body 52F of the pulling device 48F does not include a body base 54 and its body arms are implemented to be substantially parallel to one another, for example, at least before pulling force is exerted on the body arms to move them toward one another. Moreover, as depicted, the pulling device 48F of FIG. 10 additionally includes a scissor linkage assembly 92. In particular, the first body arm 56F and the second body arm 58F are coupled together as well as to a first pipe grabber 62F and a second pipe grabber 64F, respectively, via the scissor linkage assembly 92.

More specifically, as depicted, the scissor linkage assembly 92 includes multiple linkage arms 94. In particular, the scissor linkage assembly 92 includes a (e.g., first) pair of linkage arms 94—namely a first linkage arm 94A and a second linkage arm 94B—that are pivotably connected to one another at an intersection point via a (e.g., first) pivotable fastener 96A, such as a nut and bolt pair. Additionally, as depicted, the first linkage arm 94A is secured to the first body arm 56F above the pivotable fastener 96A and secured to the first pipe grabber 62F below the pivotable fastener 96A. Similarly, the second linkage arm 94B is secured to the second body arm 58F above the pivotable fastener 96A and secured to the second pipe grabber 64F below the pivotable fastener 96A. As such, when pulling force is exerted on the first body arm 56F and the second body arm 58F via the pulling cable 51 to move them toward one another, the scissor linkage assembly 92 may translate the movement of the body arms to facilitate engaging the pipe grabbers of the pulling device 48F with the outer surface 68 of a pipe segment 20 and, thus, securing the pulling device 48F along a free (e.g., unspooled) section 50 of the pipe segment 20, for example, without being limited to a free end of the pipe segment 20.

To facilitate distributing compression force exerted on a pipe segment 20 by the pipe grabbers of the pulling device 48F over a larger area and, thus, reducing likelihood of the compression force compromising structural integrity of the pipe segment 20, in the depicted example, the pulling device 48F includes multiple pairs of linkage arms 94. In particular, as depicted, the scissor linkage assembly 92 additionally includes another (e.g., second) pair of linkage arms 94—namely a third linkage arm 94C and a fourth linkage arm 94D—that are pivotably connected to one another at an intersection point via another (e.g., second) pivotable fastener 96B, such as a nut and bolt pair. Additionally, as depicted, the third linkage arm 94C is secured to the first body arm 56F above the other pivotable fastener 96B and secured to the first pipe grabber 62F below the other pivotable fastener 96B. Similarly, the fourth linkage arm 94D is secured to the second body arm 58F above the other pivotable fastener 96B and secured to the second pipe grabber 64F below the other pivotable fastener 96B.

However, it should be appreciated that the depicted example is merely intended to be illustrative and not limiting. In particular, in other embodiments, a scissor linkage assembly 92 of a pulling device 48 may include a single pair of linkage arms 94 or more than two pairs of linkage arms 94. Additionally, to facilitate accommodating multiple different pipe segment outer surface diameters and/or reducing the likelihood of over compressing a pipe segment 20, in some embodiments, the pulling device 48F of FIG. 10 may additionally include one or more spacer bars 78 and one or more spacer bar openings 80 implemented in its body arms. In any case, in this manner, a pulling device 48 of a pipe deployment system 38 may be implemented to enable the pipe deployment system 38 to exert pulling force mid-pipe (e.g., not at end) on a pipe segment 20 to be deployed in a pipeline system 10, which, at least in some instances, may facilitate improving pipeline deployment efficiency and/or pipeline operational reliability, for example, at least in part by increasing the pulling force that actually results at a corresponding pipe drum 44 and/or reducing the tensile (e.g., pulling) force absorbed by the pipe segment 20.

Figure 11:
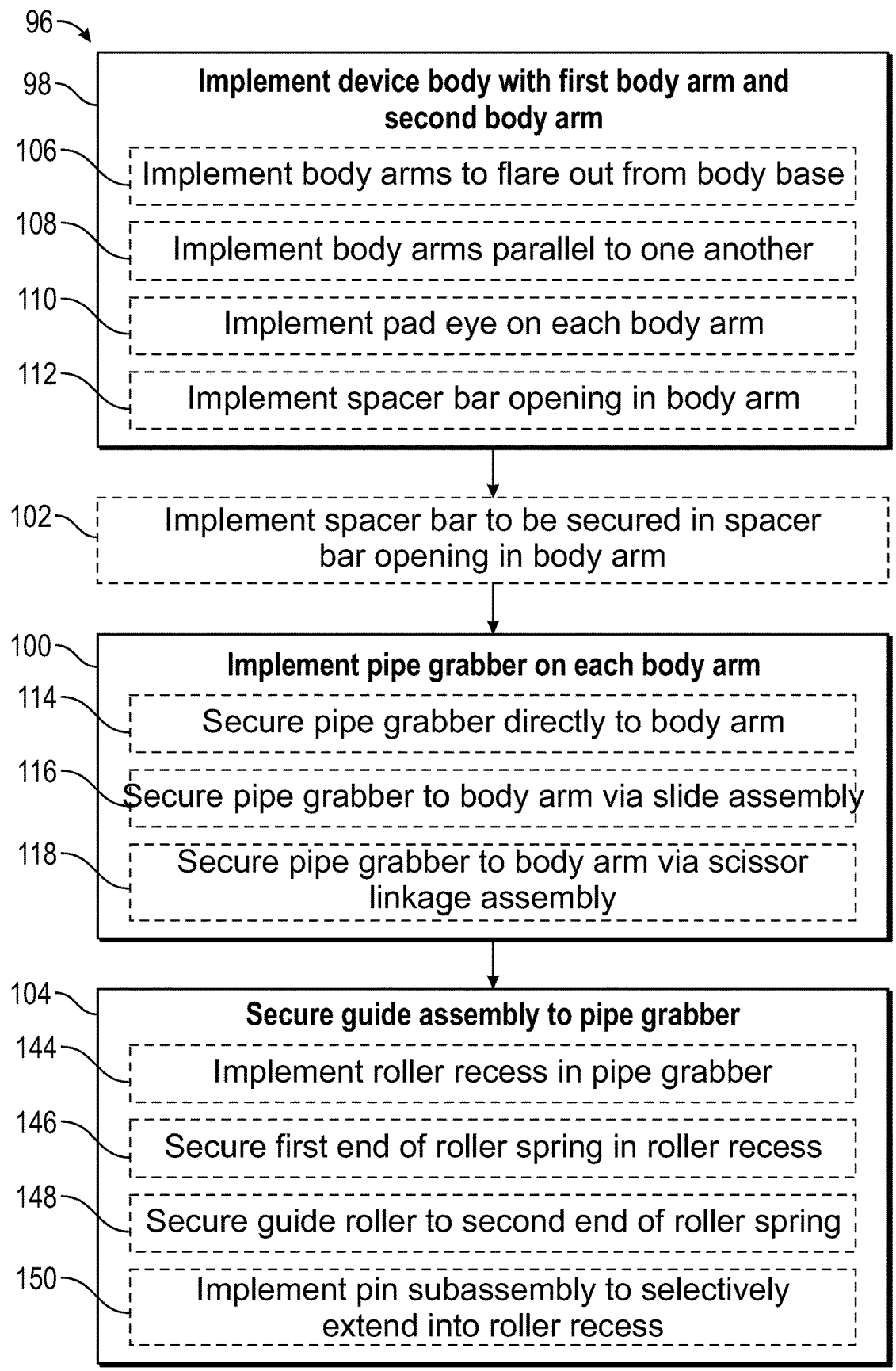
FIG. 11 is flow diagram of an example of a process for implementing a pulling device included in the pipe deployment system of FIG. 4, in accordance with an embodiment of the present disclosure.

To help further illustrate, an example of a process 96 for implementing a pulling device 48 included in a pipe deployment system 38 is described in FIG. 11. Generally, the process 96 includes implementing a device body with a first body arm and a second body arm (process block 98). Additionally, the process 96 generally includes implement a pipe grabber on each body arm (process block 100).

Although described in a specific order, which corresponds with an embodiment of the present disclosure, it should be appreciated that the example process 96 is merely intended to be illustrative and not limiting. In particular, in other embodiments, a process 96 for implementing a pulling device 48 may include one or more additional process blocks and/or omit one or more of the depicted process blocks. For example, some embodiments of the process 96 may additionally include implementing a spacer bar to be secured in a spacer bar opening in a body arm (process block 102) while other embodiments of the process 96 do not. As another example, some embodiments of the process 96 may additionally include securing a guide assembly to a pipe grabber (process block 104) while other embodiments of the process 96 do not.

In any case, as described above, a (e.g., mid-pipe) pulling device 48 in a pipe deployment system 38 may include a device body 52. In particular, as described above, the device body 52 of the pulling device 48 may include at least a first body arm 56 and a second body arm 58. As such, implementing the pulling device 48 may include implementing a device body 52 with at least a first body arm 56 and a second body arm 58 (process block 98). Merely as an illustrative non-limiting example, in some embodiments, the device body 52 may be implemented at least in part using a composite material and/or metal, such as carbon steel, stainless steel, duplex stainless steel, super duplex stainless steel, or any combination thereof.

In addition to a first body arm 56 and a second body arm 58, as described above, in some embodiments, the device body 52 of a pulling device 48 may include a body base 54, which is pivotably connected to the body arms. In particular, as described above, in some such embodiments, the first body arm 56 and the second body arm 58 may be implemented such that they flare out from the body base 54, for example, before pulling force is exerted on the body arms to move them toward one another. In other words, in such embodiments, implementing the device body 52 may include implementing the first body arm 56 and the second body arm 58 such that they flare out from the body base 54 (process block 106).

However, as described above, in other embodiments, the first body arm 56 and the second body arm 58 of a pulling device 48 may be implemented such that they are substantially parallel to one another, for example, at least before pulling force is exerted on the body arms to move them toward one another. In other words, in such embodiments, implementing the device body 52 may include implementing the first body arm 56 and the second body arm 58 such that they are substantially parallel to one another (process block 108). In particular, as described, in some such embodiments, the first body arm 56 and the second body arm 58 may additionally be implemented to be orthogonal to a body base 54 of the device body 52. Nevertheless, as described above, in other such embodiments, the device body 52 may not include a body base 54 and, thus, implementing the device body 52 may not include implementing a body base 54.

In any case, as described above, the first body arm 56 and the second body arm 58 of a pulling device 48 may each include a pad eye 74 that facilitates securing a corresponding cable branch 70 of a pulling cable 51 thereto. In other words, implementing the device body 52 may include implementing a pad eye 74 on each of its body arms (process block 110). For example, a first pad eye 74A may be implemented on the first body arm 56 to enable a first cable branch 70A of the pulling cable 51 to be secured thereto and a second pad eye 74B may be implemented on the second body arm 58 to enable a second cable branch 70B of the pulling cable 51 to be secured thereto. As described above, implementing the device body 52 of a pulling device 48 in this manner may enable a pulling force exerted on the pulling cable 51 (e.g., by pulling equipment 40) in a direction away from the pulling device 48 to cause the first body arm 56 and the second body arm 58 to move towards one another and, thus, facilitate securing the pulling device 48 to a pipe segment 20, for example, which is to be unspooled from a corresponding pipe drum 44 and/or deployed in a pipeline system 10.

Furthermore, as described above, to facilitate accommodating multiple different pipe segment outer surface diameters and/or reducing the likelihood of over compressing a pipe segment 20, in some embodiments, a pulling device 48 may include one or more spacer bars 78, which are implemented to be secured in one or more spacer bar openings 80 in the body arms of its device body 52. In other words, in such embodiments, implementing the device body 52 may include implementing (e.g., forming) one or more spacer bar openings 80 in the first body arm 56 and/or the second body arm 58, for example, such that different spacer bar openings along a body arm are associated with different pipe segment outer surface diameters (process block 112). Additionally, in such embodiments, implementing the pulling device 48 may include implementing one or more spacer bars 78 to be secured in a spacer bar opening 80 on a body arm of its device body 52 (process block 102).

In particular, as described above, to facilitate accommodating multiple different pipe segment outer surface diameters, in some such embodiments, a pulling device 48 may include a single spacer bar 78 that is implemented to be selectively secured in one of multiple spacer bar openings 80 or none at all. In other such embodiments, as described above, a pulling device 48 may include multiple spacer bars 78. For example, the pulling device 48 may include a first spacer bar 78, which is implemented to be secured to its first body arm 56, and a second spacer bar 78, which is implemented to be secured to its second body arm 58. Additionally or alternatively, one or more of the spacer bars 78 may be implemented to have different lengths.

In any case, to facilitate using the movement of its body arms toward one another to secure itself to a pipe segment 20, as described above, a pulling device 48 in a pipe deployment system 38 may include pipe grabbers—namely a first pipe grabber 62 and a second pipe grabber 64—secured to its body arms. As such, implementing the pulling device 48 may include implementing at least one pipe grabber on each of its body arms (process block 100). In particular, as described above, in some such embodiments, each pipe grabber may be implemented directly via the inner surface 66 of a corresponding body arm. Additionally, as described above, in other such embodiments, securing the pipe grabbers may include securing a first discrete pipe grabber 62 directly to the first body arm 56 and securing a second discrete pipe grabber 64 directly to the second body arm 58, for example, such that they open towards one another (process block 114).

However, as described above, in other embodiments, discrete pipe grabbers of a pulling device 48 may not be secured directly to the body arms of the pulling device 48, for example, to facilitate increasing the number of different pipe segment outer surface diameters the pulling device 48 is suitable for pulling. In particular, in some such embodiments, as described above, securing the pipe grabbers may include securing the first pipe grabber 62 to the first body arm 56 via a first slide assembly 82 and securing the second pipe grabber 64 to the second body arm 58 via a second slide assembly 84, for example, such that they open towards one another (process block 116). More specifically, as described above, securing a pipe grabber to a body arm via a slide assembly may include forming a slide opening 86 in the body arm as well as securing a slidable fastener in the slide opening 86 and to the pipe grabber, for example, in addition to implementing a rachet subassembly and/or a pin subassembly.

In other embodiments, as described, securing the pipe grabbers may include securing the first pipe grabber 62 to the first body arm 56 and securing the second pipe grabber 64 to the second body arm 58 via a scissor linkage assembly 92 (process block 118). In particular, as described above, securing the first pipe grabber 62 to the first body arm 56 via the scissor linkage assembly 92 may include securing a first linkage arm 94A to the first body arm 56 above a pivotable fastener 96A at which the first linkage arm 94A is pivotably connected to a second linkage arm 94B and securing the first linkage arm 94A to the first pipe grabber 62 below the pivotable fastener 96A. Similarly, as described above, securing the second pipe grabber 64 to the second body arm 58 via the scissor linkage assembly 92 may include securing the second linkage arm 94B to the second body arm 58 above the pivotable fastener 96A at which the second linkage arm 94B is pivotably connected to the first linkage arm 94A and securing the second linkage arm 94B to the second pipe grabber 64 below the pivotable fastener 96A. In this manner, a pulling device 48 in a pipe deployment system 38 may be implemented to enable the pipe deployment system 38 to exert pulling force on a pipe segment 20 to be deployed in a pipeline system 10 mid-pipe (e.g., not at end), which, at least in some instances, may facilitate improving pipeline deployment efficiency and/or pipeline operational reliability, for example, at least in part by increasing the pulling force that actually results at a corresponding pipe drum 44 and/or reducing the tensile (e.g., pulling) force absorbed by the pipe segment 20.

In fact, to facilitate further improving pipeline deployment efficiency and/or pipeline operational reliability, in some embodiments, a pulling device 48 in a pipe deployment system 38 may be implemented to enable the pulling device 48 to be selectively operated as a guiding device. Generally, a guiding device in a pipe deployment system 38 may operate to guide a pipe segment 20 through a point at which a corresponding pipeline system 10 is to be deployed as the pipe segment 20 is pulled (e.g., unspooled) off of a corresponding pipe drum 44. In other words, the guiding device may generally facilitate anchoring the pipeline system 10 at a target position while one or more pipe segments 20 is being deployed (e.g., pulled and laid) therein.

Figure 12:
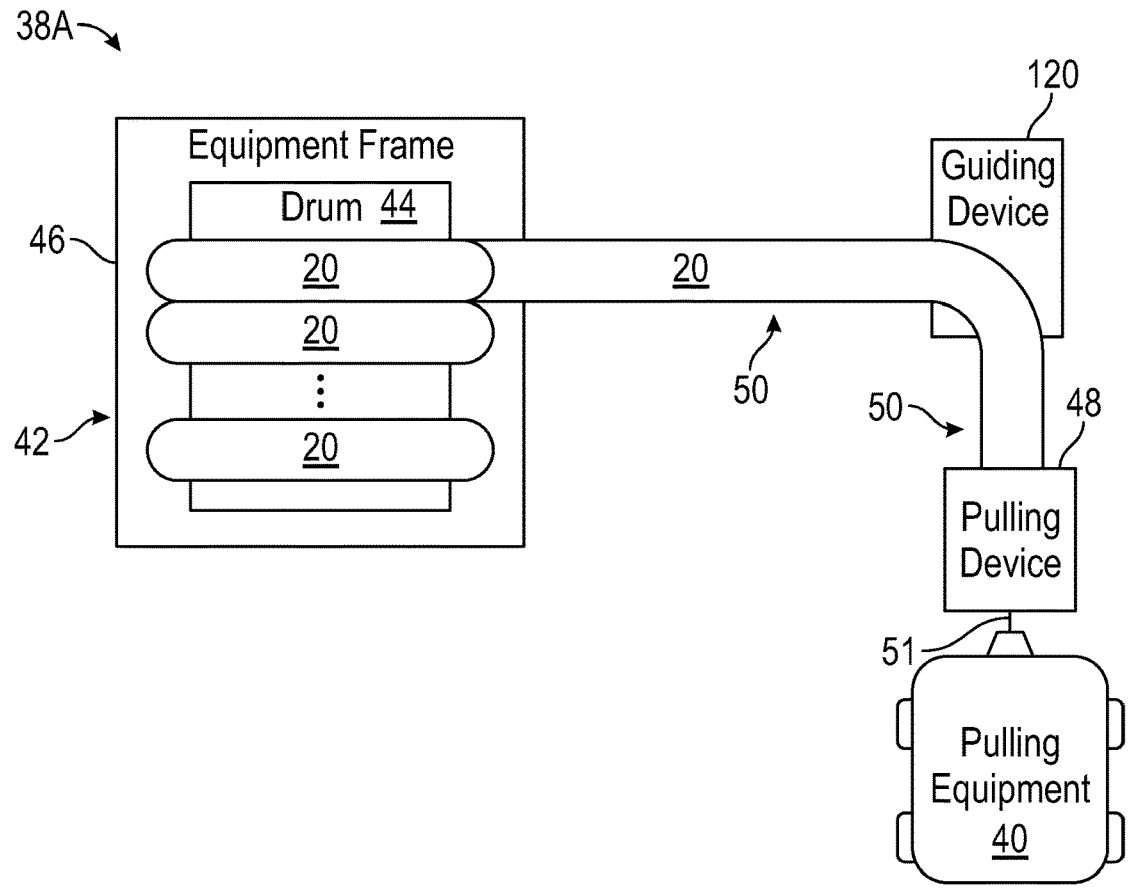
FIG. 12 is a top view of an example of a pipe deployment system that includes a pulling device, a guiding device, and pipe deployment equipment, which is loaded with a pipe segment that is spooled on a pipe drum, passes through the guiding device, and is secured to the pulling device, in accordance with an embodiment of the present disclosure.

To help illustrate, another example of a pipe deployment system 38A, which includes a guiding device 120, is shown in FIG. 12. Similar to FIG. 4, as depicted in FIG. 12, the pipe deployment system 38A includes pipe deployment equipment 42, such as a pipe deployment trailer or a pipe deployment frame, with a pipe drum 44 and one or more pipe segments 20 spooled thereon loaded on its equipment frame 46. Additionally, similar to FIG. 4, as depicted in FIG. 12, the pipe deployment system 38A includes a pulling device 48 that is secured to a free section 50 of a pipe segment 20 and to pulling equipment 40, such as a tow vehicle (e.g., truck), an excavator, or a bulldozer, via one or more pulling cables 51.

However, as depicted in FIG. 12, the pipe deployment system 38A additionally includes the guiding device 120 disposed between the pipe drum 44 and the pulling device 48. More specifically, as depicted, the pipe segment 20 being unspooled off of the pipe drum 44 via the pulling device 48 passes through the guiding device 120. In other words, as pulling force is exerted on the pulling device 48, the pipe segment 20 may be pulled through the guiding device 120, thereby anchoring a pipeline system 10 in which the pipe segment 20 is being deployed to the location at which the guiding device 120 is deployed. In fact, as in the depicted example, in some embodiments, a guiding device 120 may anchor a pipeline system 10 in this manner to facilitate producing a bend (e.g., curve) in the pipeline system 10, for example, at least in part by blocking a pipe segment 20 from simply extending in a relatively straight line between a corresponding pipe drum 44 and a pulling device 48 secured thereto when pulling force is exerted on the pulling device 48.

However, it should be appreciated that the depicted example is merely intended to be illustrative and not limiting. In particular, in some embodiments, the depicted pulling device 48 may be a pulling device 48 described in the present disclosure and, thus, secured to the free section 50 of the pipe segment 20 mid-pipe, for example, instead of to a free end of the pipe segment 20. Additionally or alternatively, in other embodiments, a pipe deployment system 38 may include multiple guiding devices 120, for example, to facilitate producing multiple bends (e.g., curves) in a pipeline system 10.

In any case, as described above, in some embodiments, a pulling device 48 in a pipe deployment system 38 may be implemented to enable the pulling device 48 to be selectively operated as a guiding device 120. In other words, in such embodiments, the depicted guiding device 120 may also be a pulling device 48 and, thus, the pipe deployment system 38A includes multiple pulling devices 48. To enable being selectively operated as a guiding device 120, in some embodiments, a pulling device 48 may additionally include one or more guide assemblies secured to its pipe grabbers.

Figure 13:
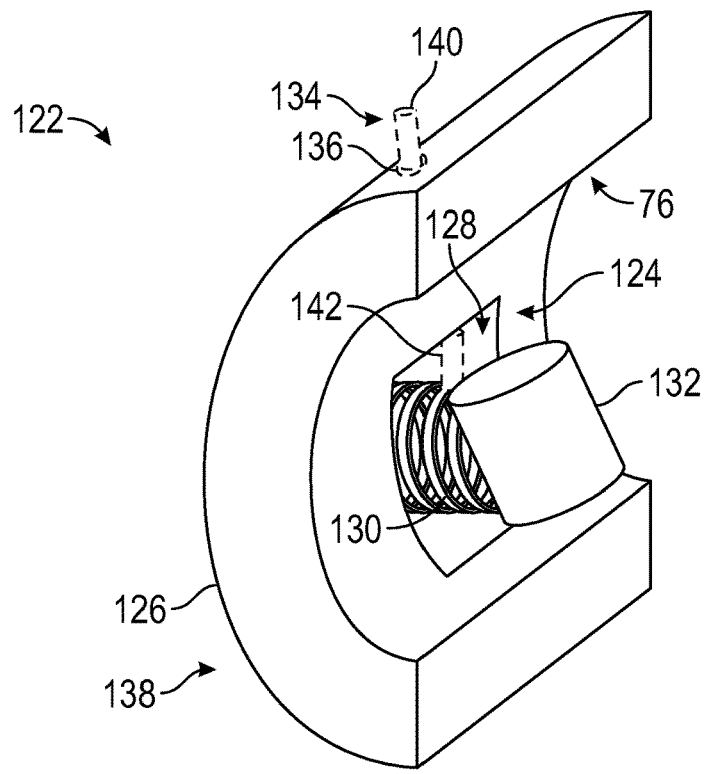
FIG. 13 is perspective view of a portion of a pulling device that includes a guide assembly that enables the pulling device to selectively operate as the guiding device of FIG. 12, in accordance with an embodiment of the present disclosure.

To help illustrate, an example of a portion 122 of a pulling device 48, which includes a guide assembly 124, is shown in FIG. 13. In addition to the guide assembly 124, as depicted, the portion 122 of the pulling device 48 includes a pipe grabber 126, such as a first pipe grabber 62 or a second pipe grabber 64, of the pulling device 48. In particular, although partially obfuscated from view, the guide assembly 124 is secured to the inner surface 76 of the pipe grabber 126.

It should be appreciated that, to facilitate selectively operating as a guiding device 120, in some embodiments, a pulling device 48 may include a guide assembly 124 secured to each of its pipe grabbers. For example, in such embodiments, the pulling device 48 may include a first guide assembly 124 secured to its first pipe grabber 62 and a second guide assembly 124 secured to its second pipe grabber 64. Nevertheless, to facilitate reducing component count and/or physical footprint, in other embodiments, a pulling device 48 may include guide assemblies 124 secured only to a subset of its pipe grabbers, for example, when a pipe segment 20 being pulled through the pulling device 48 is not expected to contact (e.g., engage) the remaining pipe grabbers.

In any case, as depicted, the guide assembly 124 of the pulling device 48 includes a roller recess (e.g., cavity) 128 implemented on the inner surface 76 of the pipe grabber 126, a roller spring 130 disposed in the roller recess 128, and a guide roller 132 secured to the roller spring 130. In particular, although partially obfuscated from view, the roller spring 130 is disposed in the roller recess 128 such that a first end of the roller spring 130 is secured to a closed end of the roller recess 128. Additionally, in the depicted example, the guide roller 132 is secured to a second end of the roller spring 130 such the guide roller 132 extends out of the roller recess 128 beyond the inner surface 76 of the pipe grabber 126 when the roller spring 130 is in its static (e.g., equilibrium) state. In other words, while the roller spring 130 is in its static state, the guide assembly 124 may be in an activated state in which the guide roller 132 extends out beyond the roller recess 128 and, thus, the inner surface 76 of the pipe grabber 126. As such, when a pipe segment 20 is disposed within the pulling device 48 while the guide assembly 124 is in its activated state, the guide roller may contact the outer surface 68 of the pipe segment 20 before the inner surface 76 of the pipe grabber and, thus, facilitate anchoring a corresponding pipeline system 10 in place while reducing the resistance the pulling (e.g., guiding) device 48 exerts against movement of the pipe segment 20 therethrough.

However, when a pipe segment 20 being pulled through a pulling device 48 contacts a guide assembly 124 of the pulling device 48, the pipe segment 20 may exert some amount of force on the guide roller 132 and, thus, the roller spring 130 of the guide assembly 124. In fact, in some instances, the force exerted on the guide assembly 124 by the pipe segment 20 may overpower the roller spring 130, thereby resulting in the guide roller 132 being pushed into the roller recess 128. In other words, at least in some such instances, the force exerted on the guide assembly 124 by the pipe segment 20 may cause the guide assembly 124 to inadvertently transition from its activated state to a deactivated state in which the guide roller 132 does not extend out of the roller recess 128.

To facilitate reducing the likelihood that a guide assembly 124 of a pulling device 48 inadvertently transitions between its activated state to its deactivated state, as in the depicted example, in some embodiments, the guide assembly 124 may additionally include a pin subassembly 134. Although partially obfuscated from view, in the depicted example, the pin subassembly 134 includes a pin opening 136, which extends from an outer surface 138 of the pipe grabber 126 into the roller recess 128, and a pin 140, which is selectively inserted and secured in the pin opening 136. In particular, in some such embodiments, while the guide assembly 124 is in its activated state, the pin 140 may be secured in the pin opening 136 such that its pin head 142 extends into the roller cavity 128 behind the guide roller 132 and, thus, blocks the guide assembly 124 from inadvertently transitioning from its activated state to its deactivated state. Additionally or alternatively, while the guide assembly 124 is in its deactivated state, the pin 140 may be secured in the pin opening 136 such that its pin head 142 extends into the roller cavity 128 in front of the guide roller 132 and, thus, blocks the from inadvertently transitioning from its deactivated state to its activated state.

However, it should be appreciated that the depicted example is merely intended to be illustrative and not limiting. In particular, in other embodiments, a guide assembly 124 of a pulling (e.g., guiding) device 48 may not include a pin subassembly 134, for example, when its roller spring 130 is expected to be sufficient to overcome force exerted on the guide assembly 124 by a pipe segment 20 being pulled through the pulling device 48. In any case, in this manner, a pulling device 48 may be implemented to enable the pulling device 48 to be selectively operated as a guiding device 120 in a pipe deployment system 38, which, at least in some instances, may facilitate improving deployment efficiency of the pipeline system, for example, at least in part by obviating inclusion of a separate guiding device 120 in the pipe deployment system 38.

Thus, returning to the process 96 of FIG. 11, to enable a pulling device 48 to be selectively operated as a guiding device 120, in some embodiments, implementing the pulling device 48 may include securing one or more guide assemblies 124 to corresponding pipe grabbers of the pulling device 48 (process block 104). For example, a first guide assembly 124 may be secured to the inner surface 76 of the first pipe grabber 62 in the pulling device 48. Additionally or alternatively, a second guide assembly 124 may be secured to the inner surface 76 of the second pipe grabber 64 in the pulling device 48.

As described above, a guide assembly 124 of a pulling device 48 may generally include a roller recess 128 implemented on the inner surface 76 of a corresponding pipe grabber 126. As such, securing a guide assembly 124 to a pipe grabber 126 may include implementing a roller recess 128 on the inner surface 76 of the pipe grabber 126 (process block 144). In particular, in some embodiments, a roller recess 128 may be implemented in a pipe grabber 126 during initial manufacture of the pipe grabber 126, for example, at least in part by molding material of the pipe grabber 126 to include the roller recess 128 on its inner surface 76. However, in other embodiments, a roller recess 128 may be implemented in a pipe grabber 126 after the pipe grabber 126 is initially manufactured, for example, at least in part by subsequently removing (e.g., drilling, milling, and/or etching) material from the inner surface 76 of the pipe grabber 126.

In addition to a roller recess 128, as described above, a guide assembly 124 of a pulling device 48 may generally include a roller spring 130 and a guide roller 132. In particular, as described above, the roller spring 130 may be disposed in the roller recess 128 such that a first end of the roller spring 130 is secured to a closed end of the roller recess 128 while a second end of the roller spring 130 is secured to the guide roller 132. As such, securing a guide assembly 124 to a pipe grabber 126 may include securing a first end of a roller spring 130 in a roller recess 128 implemented in the pipe grabber 126 (process block 146) and securing a second end of the roller spring 130 to a guide roller 132 (process block 148).

Furthermore, as described above, to facilitate blocking a guide assembly 124 of a pulling device 48 from inadvertently transitioning between its activated state and its deactivated state, in some embodiments, the guide assembly 124 may additionally include a pin subassembly 134. In other words, in such embodiments, securing a guide assembly 124 to a pipe grabber 126 may include implementing a pin subassembly 134 that is to be selectively extended into a roller recess 128 of the guide assembly 124 (process block 150). In particular, as described above, the pin subassembly 134 may be implemented at least in part by implementing (e.g., forming) a pin opening 136 that extends from the outer surface 138 of the pipe grabber 126 to the roller recess 128 and implementing a pin 140, which is to be selectively inserted and secured in the pin opening 135 such that its pin head 142 is present in the roller recess 128.

Similar to the roller recess 128, in some embodiments, a pin opening 136 may be implemented in a pipe grabber 126 during initial manufacture of the pipe grabber 126, for example, at least in part by molding material of the pipe grabber 126 to include the pin opening 136. However, in other embodiments, a pin opening 136 may be implemented in a pipe grabber 126 after the pipe grabber 126 is initially manufactured, for example, at least in part by subsequently removing (e.g., drilling, milling, and/or etching) material between the outer surface 138 of the pipe grabber 126 and a roller recess 128 implemented in the pipe grabber 126. In any case, in this manner, a pulling device 48 may be implemented to enable the pulling device 48 to be selectively operated as a guiding device 120 in a pipe deployment system 38, which, at least in some instances, may facilitate improving pipeline deployment efficiency, for example, at least in part by obviating inclusion of a separate guiding device 120 in the pipe deployment system 38.

Figure 14:
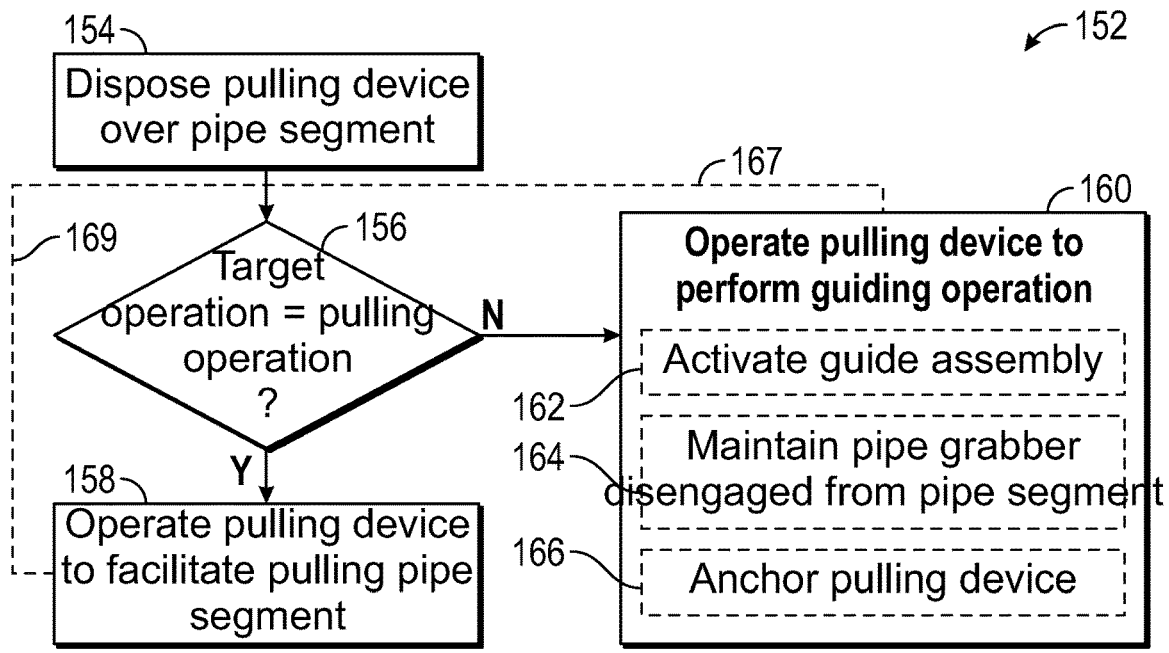
FIG. 14 is a flow diagram of an example of a process for operating the pulling device of FIG. 13, in accordance with an embodiment of the present disclosure.

To help further illustrate, an example of a process 152 for operating a (e.g., mid-pipe) pulling device 48 included in a pipe deployment system 38 is described in FIG. 14. Generally, the process 152 includes disposing a pulling device over a pipe segment (process block 154) and determining whether a target operation to be performed by the pulling device is a pulling operation (decision block 156). Additionally, the process 152 generally includes operating the pulling device to facilitate pulling a pipe segment when the target operation is a pulling operation (process block 158) and operating the pulling device to perform a guiding operation when the target operation is not a pulling operation (process block 160).

Although described in a specific order, which corresponds with an embodiment of the present disclosure, it should be appreciated that the example process 152 is merely intended to be illustrative and not limiting. In particular, in other embodiments, a process 152 for operating a pulling device 48 may include one or more additional process blocks and/or omit one or more of the depicted process blocks. Additionally or alternatively, in other embodiments, the process 152 may be performed in a different order, for example, such that whether the target operation is a pulling operation is determined before the pulling device is disposed over the pipe segment.

In any case, as described above, a (e.g., mid-pipe) pulling device 48 may generally be implemented to be disposed over a pipe segment 20 that is to be pulled and/or guided using the pulling device 48. As such, operating the pulling device 48 may include disposing the pulling device 48 over the pipe segment 20 (process block 154). In particular, the pulling device 48 may be disposed such that its device body 52 is on top of (e.g., covers) the pipe segment 20 while its first pipe grabber 62 and its second pipe grabber 64 are on opposite sides of the pipe segment 20.

Additionally, as described above, in some embodiments, a pulling device 48 may be selectively operated as a guiding device 120 in a pipe deployment system 38 and, thus, to perform a guiding operation. As such, when the target operation to be performed by the pulling device 48 is not a pulling operation, the pulling device 48 may be operated to perform a guiding operation (process block 160). To facilitate performing a guiding operation, as described above, the pulling device 48 may include one or more guide assemblies 124, which each has a roller recess 128 in a corresponding pipe grabber 126, a roller spring 130 with a first end secured to a closed end of the roller recess 128, and a guide roller 132 secured to a second end of the roller spring 130.

Furthermore, as described above, in some embodiments, a guide assembly 124 of a pulling device 48 may be selectively transitioned between its activated state in which its guide roller 132 extends out of its roller recess 128 beyond the inner surface 76 of a corresponding pipe grabber 126 and its deactivated state in which its guide roller 132 does not extend out of its roller recess 128 beyond the inner surface 76 of the pipe grabber 126. Thus, in such embodiments, operating the pulling device 48 to perform a guiding operation may include activating one or more guide assemblies 124 of the pulling device (process block 162). In particular, as described above, in some such embodiments, a guide assembly 124 of a pulling device 48 may be activated at least in part by securing a pin 140 in a pin opening 136, which extends from its roller recess 128 to an outer surface 138 of a corresponding pipe grabber 126, such that a pin head 142 of the pin 140 is present in the roller recess 128 behind its guide roller 132, thereby blocking the guide assembly 124 from inadvertently transitioning from its activated state to its deactivated state. In any case, since a guide roller 132 of a guide assembly 124 extends out beyond the inner surface 76 of a corresponding pipe grabber 126 while the guide assembly 124 is in its activated state, activating the guide assembly 124 may facilitate maintaining the pipe grabber 126 disengaged from the outer surface 68 of a pipe segment 20 being guided by the pulling (e.g., guiding) device 48 (process block 164).

Moreover, as described above, while operating as a guiding device 120, a pulling device 48 may guide a pipe segment 20 through a point at which a corresponding pipeline system 10 is to be deployed as the pipe segment 20 is pulled (e.g., unspooled) off of a corresponding pipe drum 44. In other words, while operating as a guiding device 120, the pulling device 48 may generally anchor the pipeline system 10 at a target position while one or more pipe segments 20 is being deployed (e.g., pulled and laid) therein, for example, to facilitate producing one or more bends (e.g., curves) in the pipeline system 10. To facilitate anchoring a pipeline system 10 at a target position, in some embodiments, operating a pulling device 48 to perform a guiding operation may include anchoring (e.g., securing) the pulling device 48 at the target position, for example, at least in part by tying one or more stakes to pad eyes 74 on the body arms of the pulling device 48 (process block 166).

In fact, in some embodiments, a pulling device 48 previously used to perform a guiding operation may be subsequently used to facilitate performing a pulling operation, for example, on the same pipe segment 20 (arrow 167). Similarly, in some embodiments, a pulling device 48 previously used to perform facilitate performing a pulling operation may be subsequently used to perform a guiding operation, for example, on the same pipe segment 20 (arrow 169). In any case, when the target operation is a pulling operation, the pulling device 48 may be operated to facilitate pulling a pipe segment 20 (process block 158). In particular, as described above, to facilitate pulling a pipe segment 20, the pulling device 48 may be secured to the pipe segment 20 to enable pulling force to be exerted on the pipe segment 20.

Figure 15:
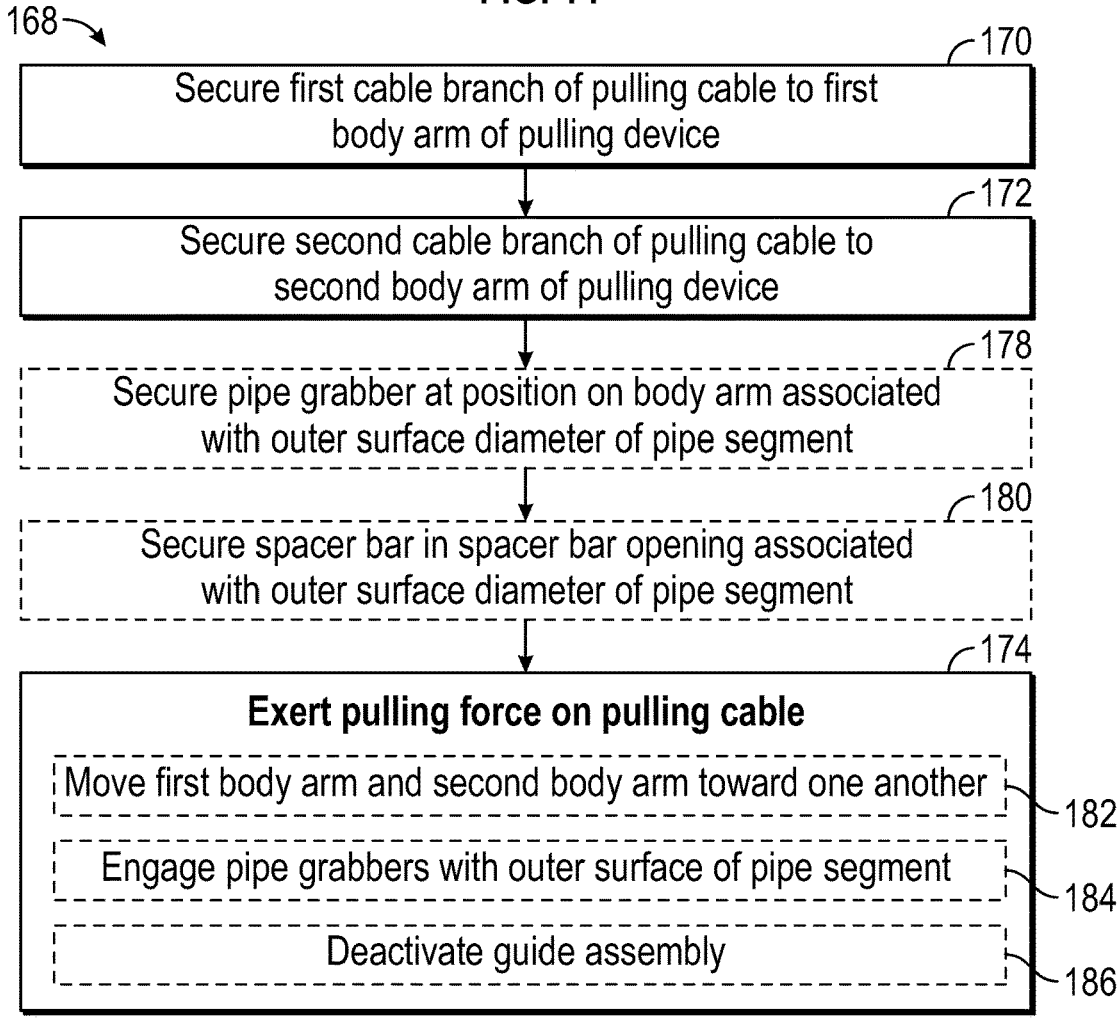
FIG. 15 is a flow diagram of an example of a process for operating a pulling device to facilitate performance of a pulling operation, in accordance with an embodiment of the present disclosure.

To help illustrate, an example of a process 168 for operating a pulling device 48 to facilitate performing a pulling operation is described in FIG. 15. Generally, the process 168 includes securing a first cable branch of a pulling cable to a first body arm of a pulling device (process block 170) and securing a second cable branch of the pulling cable to a second body arm of the pulling device (process block 172). Additionally, the process 168 generally includes exerting pulling force on the pulling cable (process block 174).

Although described in a specific order, which corresponds with an embodiment of the present disclosure, it should be appreciated that the example process 168 is merely intended to be illustrative and not limiting. In particular, in other embodiments, a process 168 for operating a pulling device 48 to facilitate performing a pulling operation may include one or more additional process blocks and/or omit one or more of the depicted process blocks. For example, some embodiments of the process 168 may additionally include securing a pipe grabber at a position on a body arm that is associated with an outer surface diameter of a pipe segment (process block 178) while other embodiments of the process 168 do not. As another example, some embodiments of the process 168 may additionally include securing a spacer bar in a spacer bar opening that is associated with an outer surface diameter of a pipe segment (process block 180) while other embodiments of the process 168 do not.

In any case, as described above, a (e.g., mid-pipe) pulling device 48 may generally include a first body arm 56 and a second body arm 58. Additionally, to facilitate exerting pulling force on a pipe segment 20 via the pulling device 48, as described above, a cable branch 70 of a pulling cable 51 may be secured to each body arm of the pulling device 48. As such, operating the pulling device 48 to facilitate performing a pulling operation may include securing a first cable branch 70A of a pulling cable 51 to the first body arm 56 of the pulling device 48 (process block 170) and securing a second cable branch 70B of the pulling cable 51 to the second body arm 58 of the pulling device (process block 172), for example, via a first pad eye 74A on the first body arm 56 and a second pad eye 74B on the second body arm 58, respectively.

After a pulling cable 51 is secured to the body arms of a pulling device 48, pulling force may be exerted on the pulling cable 51 and, thus, the body arms of the pulling device 48. In fact, since the cable branches 70 of the pulling cable 51 are connected, as described above, exerting pulling force on the pulling cable 51 may cause the first body arm 56 and the second body arm 58 of the pulling device 48 to move toward one another (process block 182). Additionally, as described above, a pulling device 48 may include a pipe grabber secured to each of its body arms. Thus, as described above, exerting pulling force on the pulling cable 51 that causes the first body arm 56 and the second body arm 58 to move toward one another may facilitate engaging the inner surface 76 of a first pipe grabber 62, which is secured to the first body arm 56, and/or the inner surface 76 of a second pipe grabber 64, which is secured to the second body arm 58, with the outer surface 68 of a pipe segment 20 to be pulled via the pulling device 48 (process block 184).

Furthermore, as described above, to enable a pulling device 48 to be selectively operated as a guiding device 120 in a pipe deployment system 38, in some embodiments, the pulling device 48 may include one or more guide assemblies 124, which each include a roller recess 128 in a corresponding pipe grabber 126, a roller spring 130 with a first end secured to a closed end of the roller recess 128, and a guide roller 132 secured to a second end of the roller spring 130. In particular, as described above, in such embodiments, a guide assembly 124 of the pulling device 48 may be selectively transitioned between its activated state in which its guide roller 132 extends out of its roller recess 128 beyond the inner surface 76 of a corresponding pipe grabber 126 and its deactivated state in which its guide roller 132 does not extend out of its roller recess 128 beyond the inner surface 76 of the pipe grabber 126. In fact, in some such embodiments, exerting pulling force on a pulling device 48 that causes the inner surfaces 76 of its pipe grabbers to engage the outer surface of a pipe segment 20 may also push the guide roller 132 of the guide assembly 124 into its roller recess 128, thereby deactivating the guide assembly 124 (process block 186).

However, in other embodiments, a guide assembly 124 of a pulling device 48 may be actively deactivated via a pin subassembly 134 of the guide assembly 124. As described above, a pin subassembly 134 of a guide assembly 124 may include a pin opening 136, which extends from the outer surface 138 of a corresponding pipe grabber 126 into a roller recess 128 on the inner surface 76 of the pipe grabber 126, and a pin 140, which is to be selectively inserted and secured in the pin opening 136 such that its pin head 142 is present within the roller recess 128. Thus, in some such embodiments, the guide assembly 124 may be actively deactivated at least in part by separately pushing the guide roller 132 into the roller recess 128 and securing the pin 140 in the pin opening 136 such that its pin head 142 is disposed in front of the guide roller 132.

In any case, as described above, engaging the inner surface 76 of the pipe grabbers of a pulling device 48 with the outer surface 68 of a pipe segment 20 may facilitate securing the pulling device 48 to the pipe segment 20 and, thus, pulling the pipe segment 20 via the pulling device 48. However, to facilitate reducing the likelihood of the pulling device 48 over compressing the pipe segment 20 and, thus, compromising structural integrity of the pipe segment 20, in some embodiments, the pipe grabbers of the pulling device 48 may be implemented such that the inner surface diameter of the pipe grabbers that results when they directly abut one another matches or is slightly smaller than a default (e.g., uncompressed and/or undeformed) outer surface diameter of the pipe segment 20. In this manner, a pulling device 48 in a pipe deployment system 38 may be operated to facilitate pulling a pipe segment 20 to be deployed in a pipeline system 10 mid-pipe (e.g., not at end), which, at least in some instances, may facilitate improving pipeline deployment efficiency and/or pipeline operational reliability, for example, at least in part by increasing the pulling force that actually results at a corresponding pipe drum 44 and/or reducing the tensile (e.g., pulling) force absorbed by the pipe segment 20.

However, to facilitate further improving pipeline deployment efficiency, in some embodiments, a pulling device 48 may be implemented to be suitable for pulling multiple different pipe segment outer surface diameters. In particular, as described above, to facilitate adjusting its pipe grabber inner surface diameter, in some such embodiments, the pipe grabbers of the pulling device 48 may be secured to corresponding body arms via slide assemblies (e.g., first slide assembly 82 and second slide assembly 84). Additionally, as described above, in such embodiments, different positions along a slide assembly on a body arm may be associated with different pipe segment outer surface diameters. In other words, before pulling force is exerted on the pulling device 48 via a pulling cable 51, in such embodiments, operating the pulling device 48 to facilitate performing a pulling operation may include securing one or more pipe grabbers each at a target position on a corresponding body arm that is associated with the outer surface diameter of the pipe segment 20 to be pulled via the pulling device 48, for example, via a rachet subassembly and/or a pin subassembly of a corresponding slide assembly (process block 178).

Moreover, as described above, to facilitate accommodating multiple different pipe segment outer surface diameters, in some embodiments, a pulling device 48 may include one or more spacer bar openings 80 in its body arms and one or more spacer bars 78, which are selectively secured in a spacer bar opening 80. Additionally, as described above, in such embodiments, different spacer bar openings 80 along a body arm of the pulling device 48 may be associated with different pipe segment outer surface diameters. In other words, before pulling force is exerted on the pulling device 48 via a pulling cable 51, in such embodiments, operating the pulling device 48 to facilitate performing a pulling operation may include securing one or more spacer bars 78 each in a target spacer bar opening 80 on a corresponding body arm that is associated with the outer surface diameter of the pipe segment 20 to be pulled via the pulling device 48 (process block 180). In this manner, a pulling device 48 of a pipe deployment system 38 may be implemented to be suitable for pulling multiple different pipe segment outer surface diameters mid-pipe, which, at least in some instances, may facilitate improving pipeline deployment efficiency, for example, at least in part by reducing the number of different pulling devices 48 used to deploy a pipeline system 10 that will include pipe segments 20 with different outer surface diameters.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

What is claimed is:

1. A pipe deployment system comprising:
   pipe deployment equipment, wherein a pipe drum having spooled thereon a pipe segment comprising tubing that defines a pipe bore and a fluid conduit within an annulus of the tubing is configured to be loaded on the pipe deployment equipment; and
   a pulling device configured to be secured to an unspooled section of the pipe segment to enable pulling equipment secured to the pulling device via a pulling cable to exert horizontal pulling force on the pipe segment in a direction away from the pulling device and the pipe drum, wherein the horizontal pulling force is substantially aligned with a longitudinal axis of the pipe segment and the pulling device comprises:
      a device body configured to be disposed around the unspooled section of the pipe segment, wherein the device body comprises:
         a body base configured to extend transversely over the unspooled section of the pipe segment;
         a first body arm pivotably connected to the body base such that the first body arm is configured to extend along the longitudinal axis of the pipe segment, wherein the first body arm is configured to be secured to a first cable branch of the pulling cable; and
         a second body arm pivotably connected to the body base such that the second body arm is configured to extend along the longitudinal axis of the pipe segment, wherein the second body arm is configured to be secured to a second cable branch of the pulling cable that is connected to the first cable branch;
      a first pipe grabber secured to the first body arm of the device body; and
      a second pipe grabber secured to the second body arm of the device body such that the second pipe grabber and the first pipe grabber open towards one another, wherein, when the horizontal pulling force is exerted on the pulling device via the pulling cable, the first body arm and the second body arm are configured to pivot such that the first pipe grabber and the second pipe grabber move toward one another using a first portion of the horizontal pulling force to facilitate securing the pulling device to the unspooled section of the pipe segment and, thus, using a second portion of the horizontal pulling force to pull the unspooled section of the pipe segment away from the pipe drum.

2. The pipe deployment system of claim 1, wherein:
   the first pipe grabber comprises a first pad with a semi-circular profile and a first stem, wherein the first stem is secured to a first inner surface of the first body arm and a first outer surface of the first pad such that the first pad is spaced apart from the first body arm; and
   the second pipe grabber comprises a second pad with a semi-circular profile and a second stem, wherein the second stem is secured to a second inner surface of the second body arm and a second outer surface of the second pad such that the second pad is spaced apart from the second body arm.

3. The pipe deployment system of claim 1, wherein:
   the first body arm of the pulling device is configured to extend substantially parallel to a ground surface while the pulling device is being used to pull the unspooled section of the pipe segment; and
   the second body arm of the pulling device is configured to extend substantially parallel to the ground surface while the pulling device is being used to pull the unspooled section of the pipe segment.

4. The pipe deployment system of claim 1, wherein:
   the first body arm of the device body comprises a spacer bar opening; and
   the pulling device comprises a spacer bar configured to be secured in the spacer bar opening when the unspooled section of the pipe segment has a specific outer surface diameter to facilitate blocking movement of the first body arm and the second body arm of the pulling device toward one another beyond a certain point.

5. The pipe deployment system of claim 1, wherein the pulling device comprises:
   a first slide assembly that slidably secures the first pipe grabber to the first body arm of the device body; and
   a second slide assembly that slidably secures the second pipe grabber to the second body arm of the device body, wherein the first slide assembly and the second slide assembly are configured to flare out from the body base of the device body to facilitate adaptively adjusting pipe grabber inner surface diameter based at least in part on an outer surface diameter of the unspooled section of the pipe segment.

6. The pipe deployment system of claim 1, wherein:
   the first body arm is configured to extend longitudinally along a first side of the unspooled section of the pipe segment; and the second body arm is configured to extend longitudinally along a second side of the unspooled section of the pipe segment opposite the first body arm.

7. The pipe deployment system of claim 1, wherein the pulling device comprises a guide assembly configured to enable the pulling device to be selectively operated as a guiding device in the pipe deployment system, wherein the guide assembly comprises:
   a roller spring having a first end secured to a closed end of a roller recess on an inner surface of the first pipe grabber; and
   a guide roller secured to a second end of the roller spring, wherein the guide assembly is in an activated state when the guide roller extends out of the roller recess beyond the inner surface of the first pipe grabber and in a deactivated state when the guide roller does not extend out of the roller recess beyond the inner surface of the first pipe grabber.

8. The pipe deployment system of claim 1, wherein:
   the first body arm of the device body comprises a first pad eye at a first end opposite the body base, wherein the first pad eye is configured to enable the first cable branch of the pulling cable to be secured to the first body arm; and
   the second body arm of the device body comprises a second pad eye at a second end opposite the body base, wherein the second pad eye is configured to enable the second cable branch of the pulling cable to be secured to the second body arm.

9. A method of operating a pipe deployment system, comprising:
   disposing a pulling device of the pipe deployment system around a free section of a pipe segment that has been unspooled off of a pipe drum such that:
      a body base of the pulling device extends transversely over the free section of the pipe segment;
      a first body arm pivotably secured to the body base is substantially parallel with a ground surface; and
      a second body arm pivotably secured to the body base is substantially parallel with the ground surface;
   securing a first cable branch of a pulling cable to the first body arm of the pulling device via a first pad eye on the first body arm;
   securing a second cable branch of the pulling cable to the second body arm of the pulling device via a second pad eye on the second body arm, wherein the second cable branch is connected to the first cable branch of the pulling cable; and
   exerting, using pulling equipment in the pipe deployment system, horizontal pulling force on the pulling cable in a direction away from the pulling device and the pipe drum to cause the first body arm and the second body arm to move toward one another such that a first pipe grabber secured to the first body arm and a second pipe grabber secured to the second body arm engage an outer surface of the pipe segment as well as to cause more of the pipe segment to be unspooled off of the pipe drum, wherein the horizontal pulling force is substantially parallel with the ground surface.

10. The method of claim 9, wherein exerting the horizontal pulling force on the pulling cable comprises:
   using a first portion of the horizontal pulling force to move the first body arm and the second body arm of the pulling device toward one another to facilitate securing the pulling device to the free section of the pipe segment; and
   using a second portion of the horizontal pulling force to pull the pulling device and, thus, the free section of the pipe segment away from the pipe drum to facilitate unspooling more of the pipe segment off of the pipe drum.

11. The method of claim 9, wherein disposing the pulling device around the free section of the pipe segment comprises disposing the pulling device around the free section of the pipe segment such that:
   the first body arm extends along a longitudinal axis of the pipe segment; and
   the second body arm extends along the longitudinal axis of the pipe segment.

12. The method of claim 9, wherein disposing the pulling device around the free section of the pipe segment comprises disposing the pulling device around the free section of the pipe segment such that:
   the first body arm extends longitudinally along a first of the free section of the pipe segment; and
   the second body arm extends longitudinally along a second side of the free section of the pipe segment opposite the first body arm.

13. The method of claim 9, wherein:
   the first pad eye is secured at a first end of the first body arm opposite the body base; and
   the second pad eye is secured at a second end of the second body arm opposite the body base.

14. A pulling device in a pipe deployment system, comprising:
   a device body, wherein the device body comprises:
      a body base configured to extend transversely over a section of a pipe segment that is to be operated on by the pipe deployment system;
      a first body arm pivotably connected to the body base such that the first body arm is configured to extend longitudinally along a first side of the pipe segment, wherein the first body arm comprises a first pad eye configured to enable a first cable branch of a pulling cable to be secured to the first body arm; and
      a second body arm pivotably connected to the body base such that the second body arm is configured to extend longitudinally along a second side of the pipe segment opposite the first body arm, wherein the second body arm comprises a second pad eye configured to enable a second cable branch of the pulling cable to be secured to the second body arm;
   a first pipe grabber secured to the first body arm of the device body, wherein the first pipe grabber comprises a first semi-circular pad that is configured to engage an outer surface of the pipe segment when horizontal pulling force that is substantially parallel with a longitudinal axis of the pipe segment is exerted on the pulling cable to pivot the first body arm relative to the body base; and
   a second pipe grabber secured to the second body arm of the device body, wherein the second pipe grabber comprises a second semi-circular pad that is configured to engage the outer surface of the pipe segment when the horizontal pulling force is exerted on the pulling cable to pivot the second body arm relative to the body base.

15. The pulling device of claim 14, wherein:
   the first body arm of the device body comprises a first spacer bar opening a first distance away from the body base of the device body and a second spacer bar opening a second distance away from the body base of the device body; and the pulling device comprises a spacer bar configured to be:
- secured in the first spacer bar opening in the first body arm when the section of the pipe segment has a first default outer surface diameter; and
- secured in the second spacer bar opening in the first body arm when the section of the pipe segment has a second default outer surface diameter.

16. The pulling device of claim 14, comprising:
a first slide assembly that slidably secures the first pipe grabber to the first body arm of the device body, wherein the first slide assembly is configured to selectively secure the first pipe grabber at a first position on the first body arm that is associated with a default outer surface diameter of the section of the pipe segment; and
a second slide assembly that slidably secures the second pipe grabber to the second body arm of the device body, wherein the second slide assembly is configured to selectively secure the second pipe grabber at a second position on the second body arm that is associated with the default outer surface diameter of the section of the pipe segment.

17. The pulling device of claim 16, wherein:
the first body arm of the device body is configured to extend along the longitudinal axis of the pipe segment; and
the second body arm of the device body is configured to extend along the longitudinal axis of the pipe segment.

18. The pulling device of claim 14, comprising:
a first guide assembly, wherein the first guide assembly comprises a first roller spring having a first end secured to a first closed end of a first roller recess on a first inner surface of the first pipe grabber and a first guide roller secured to a second end of the first roller spring; and
a second guide assembly, wherein the second guide assembly comprises a second roller spring having another first end secured to a second closed end of a second roller recess on a second inner surface of the second pipe grabber and a second guide roller secured to another second end of the second roller spring.

19. The pulling device of claim 14, wherein:
the first body arm of the device body is configured to extend substantially parallel to the longitudinal axis of the pipe segment before the horizontal pulling force is exerted on the pulling device via the pulling cable; and
the second body arm of the device body is configured to extend substantially parallel to the longitudinal axis of the pipe segment before the horizontal pulling force is exerted on the pulling device via the pulling cable.

20. The pulling device of claim 14, wherein:
the first body arm of the pulling device is configured to extend substantially parallel to a ground surface while the pulling device is being used to operate on the pipe segment; and
the second body arm of the pulling device is configured to extend substantially parallel to the ground surface while the pulling device is being used to operate on the pipe segment.

* * * * *